(12) United States Patent
Matsuzaki

(10) Patent No.: US 11,414,562 B2
(45) Date of Patent: Aug. 16, 2022

(54) INK TREATMENT SOLUTION SET, INK JET RECORDING METHOD, AND INK JET RECORDING APPARATUS

(71) Applicant: Seiko Epson Corporation, Tokyo (JP)

(72) Inventor: Akiko Matsuzaki, Matsumoto (JP)

(73) Assignee: Seiko Epson Corporation

( * ) Notice: Subject to any disclaimer, the term of this patent is extended or adjusted under 35 U.S.C. 154(b) by 357 days.

(21) Appl. No.: 16/797,005

(22) Filed: Feb. 21, 2020

(65) Prior Publication Data

US 2020/0270473 A1 Aug. 27, 2020

(30) Foreign Application Priority Data

Feb. 22, 2019 (JP) .............................. JP2019-030860

(51) Int. Cl.
| | | |
|---|---|---|
| *C09D 11/54* | (2014.01) | |
| *B41M 5/00* | (2006.01) | |
| *B41J 2/01* | (2006.01) | |
| *C09D 11/322* | (2014.01) | |

(52) U.S. Cl.
CPC ................. *C09D 11/54* (2013.01); *B41J 2/01* (2013.01); *B41M 5/0017* (2013.01); *C09D 11/322* (2013.01)

(58) Field of Classification Search
CPC ......... C09D 11/38; C09D 11/54; C09D 11/40; C09D 11/322; B41M 7/0018; B41M 5/0017; B41M 5/0047; B41M 5/0064; B41J 2/01

See application file for complete search history.

(56) References Cited

U.S. PATENT DOCUMENTS

| | | | | |
|---|---|---|---|---|
| 9,010,909 | B2 * | 4/2015 | Nelson ................... | C09D 11/38 347/73 |
| 10,329,443 | B2 * | 6/2019 | Okuda ................. | B41J 11/0015 |
| 10,597,548 | B2 * | 3/2020 | Mizutani .............. | C09D 11/033 |
| 2009/0169761 | A1 * | 7/2009 | Szajewski .............. | C09D 11/40 106/31.86 |
| 2016/0289479 | A1 | 10/2016 | Okuda | |

FOREIGN PATENT DOCUMENTS

JP     2016-196177 A    11/2016

* cited by examiner

*Primary Examiner* — An H Do
(74) *Attorney, Agent, or Firm* — Harness, Dickey & Pierce, P.L.C.

(57) ABSTRACT

Provided is an ink treatment solution set including: an ink composition that is water-based ink jet ink containing a coloring material; and a treatment solution that contains a coagulant, is ejected from an ink jet head, and is used for recording, in which any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension at 1000 ms, an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and a dynamic surface tension at 1000 ms, and the ink treatment solution set is used for recording on a poorly absorbable recording medium.

16 Claims, 4 Drawing Sheets

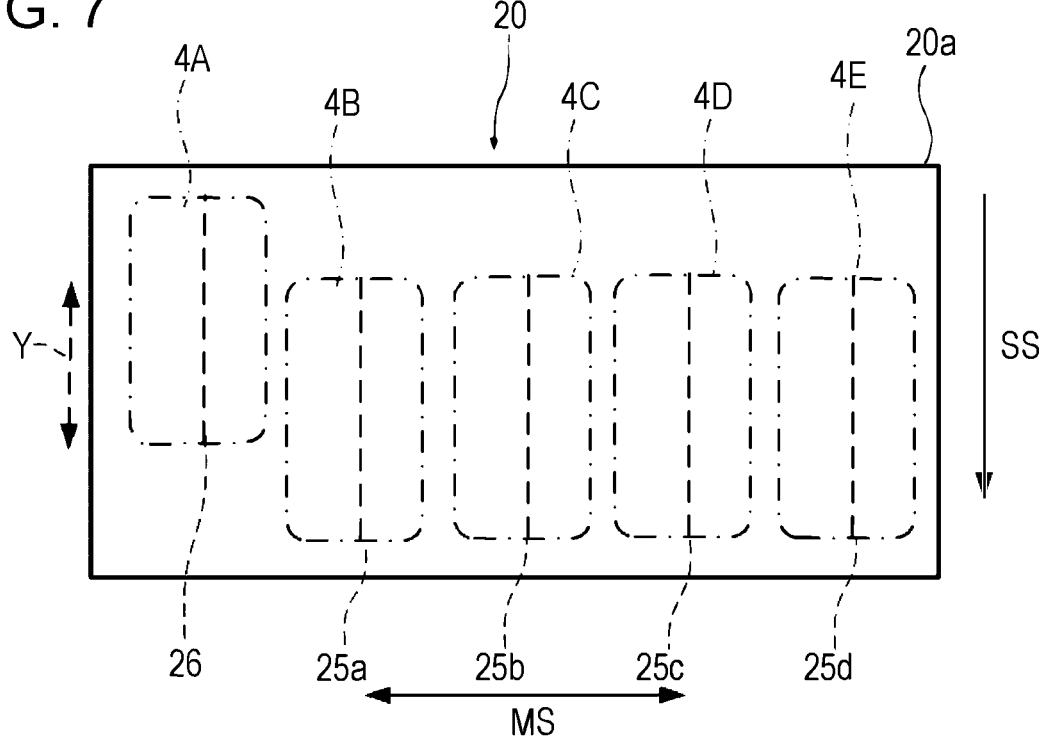

INK TREATMENT SOLUTION SET, INK JET RECORDING METHOD, AND INK JET RECORDING APPARATUS

The present application is based on, and claims priority from, JP Application Serial Number 2019-030860, filed Feb. 22, 2019, the disclosure of which is hereby incorporated by reference herein in its entirety.

BACKGROUND

1. Technical Field

The present disclosure relates to an ink treatment solution set, an ink jet recording method, and an ink jet recording apparatus.

2. Related Art

Recording by an ink jet recording method using water-based ink jet ink (hereinafter, simply referred to as "ink" or "water-based ink") on a poorly absorbable recording medium such as a film has been studied. As the water-based ink, ink that contains water as a main constituent and contains a coloring material and a resin is exemplified.

For an ink jet recording method using such water-based ink on a poorly absorbable recording medium, there are techniques for recording images by using treatment solutions containing coagulants (see JP-A-2016-196177, for example).

A further improvement in image quality is desired for an ink jet recording method using water-based ink on a poorly absorbable recording medium.

SUMMARY

[1] According to an aspect of the present disclosure, there is provided an ink treatment solution set including an ink composition that is water-based ink jet ink containing a coloring material, and a treatment solution that contains a coagulant, is ejected from an ink jet head, and is used for recording, in which any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension at 1000 ms, an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and a dynamic surface tension at 1000 ms, and the ink treatment solution set is used for recording on a poorly absorbable recording medium.

[2] In the ink treatment solution set according to [1], a difference between the dynamic surface tensions of the ink composition and the treatment solution at 10 ms may be equal to or greater than 0.2 mN/m and equal to or less than 4.5 mN/m.

[3] In the ink treatment solution set according to [1] or [2], the ink treatment solution set may be used for an ink jet recording method including main scanning performed by ejecting the ink composition and the treatment solution while moving an ink ejection nozzle group and a treatment solution ejection nozzle group along a main scanning axis and sub-scanning of moving the poorly absorbable recording medium along a sub-scanning axis that intersects the main scanning axis, in which the ink ejection nozzle group and the treatment solution ejection nozzle group have an overlapping part when the ink ejection nozzle group and the treatment solution ejection nozzle group are projected along the main scanning axis.

[4] In the ink treatment solution set according to any one of [1] to [3], a content of polyol-based organic solvent with a standard boiling point of greater than 280° C. in the ink composition may be equal to or less than 1.0% by mass.

[5] In the ink treatment solution set according to any one of [1] to [4], the treatment solution may contain any one of a polyvalent metal salt, a cationic polymer, and an organic acid as the coagulant.

[6] In the ink treatment solution set according to any one of [1] to [5], the treatment solution may be used for an ink jet recording method of ejecting the treatment solution from the ink jet head such that an amount of droplet of the treatment solution is equal to or greater than 4 ng and equal to or less than 25 ng, thereby causing the treatment solution to adhere to the poorly absorbable recording medium.

[7] In the ink treatment solution set according to any one of [1] to [6], a surface temperature of the poorly absorbable recording medium when the treatment solution is ejected from the ink jet head and is caused to adhere to the poorly absorbable recording medium may be equal to or greater than 20° C. and equal to or less than 45° C.

[8] In the ink treatment solution set according to any one of [1] to [7], an amount of solution absorbed by the poorly absorbable recording medium may be equal to or less than 1.5 mL/m$^2$.

[9] In the ink treatment solution set according to any one of [1] to [8], the ink composition and the treatment solution may contain surfactants.

[10] In the ink treatment solution set according to any one of [1] to [9], the ink composition may have the dynamic surface tension higher than the dynamic surface tension of the treatment solution at 10 ms, and the ink composition may correspond to the other one.

[11] According to another aspect of the present disclosure, there is provided an ink jet recording method including an ink adhesion step of ejecting an ink composition that is water-based ink jet ink containing a coloring material from an ink jet head and causing the ink composition to adhere to a poorly absorbable recording medium, and a treatment solution adhesion step of ejecting a treatment solution containing a coagulant from the ink jet head and causing the treatment solution to adhere to the poorly absorbable recording medium, in which any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension of 1000 ms, and an other one of the ink composition and the treatment solution has a dynamic surface tension of greater than 34.5 mN/m at 10 ms and less than 36.5 mN/m at 10 ms and has a difference of equal to or greater than 8.0 mN/m and equal to or less than 10.0 mN/m between the dynamic surface tension at 10 ms and a dynamic surface tension at 1000 ms.

[12] In the ink jet recording method according to [11], a region, to which the ink composition and the treatment solution are caused to adhere, on the poorly absorbable recording medium may have a region in which an amount of the treatment solution adhering is equal to or greater than 10% by mass of an amount of the ink composition adhering.

[13] The ink jet recording method according to [11] or [12] may further include a heating step of heating the poorly absorbable recording medium with a heating mechanism, in which the ink adhesion step and the treatment solution adhesion step may be performed on the poorly absorbable recording medium that is heated.

[14] In the ink jet recording method according to any one of [11] to [13], the ink jet head may include an ink ejection nozzle group and a treatment solution ejection nozzle group, and the ink ejection nozzle group and the treatment solution ejection nozzle group may have an overlapping part when the ink ejection nozzle group and the treatment solution ejection nozzle group are projected along a main scanning axis.

[15] According to still another aspect of the present disclosure, there is provided an ink jet recording apparatus including an ink jet head including an ink ejection nozzle group that ejects an ink composition that is a water-based ink jet ink containing a coloring material and causes the ink composition to adhere to a poorly absorbable recording medium and a treatment solution ejection nozzle group that ejects a treatment solution containing a coagulant and causes the treatment solution to adhere to the poorly absorbable recording medium, in which any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension at 1000 ms, and an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and a dynamic surface tension at 1000 ms.

[16] In the ink jet recording apparatus according to [15], the ink ejection nozzle group and the treatment solution ejection nozzle group may have an overlapping part when the ink ejection nozzle group and the treatment solution ejection nozzle group are projected along a main scanning axis.

BRIEF DESCRIPTION OF THE DRAWINGS

FIG. 7 is an outline top view schematically illustrating another example of alignment of the nozzle groups in the ink jet head.

DESCRIPTION OF EXEMPLARY EMBODIMENTS

Figure 1:
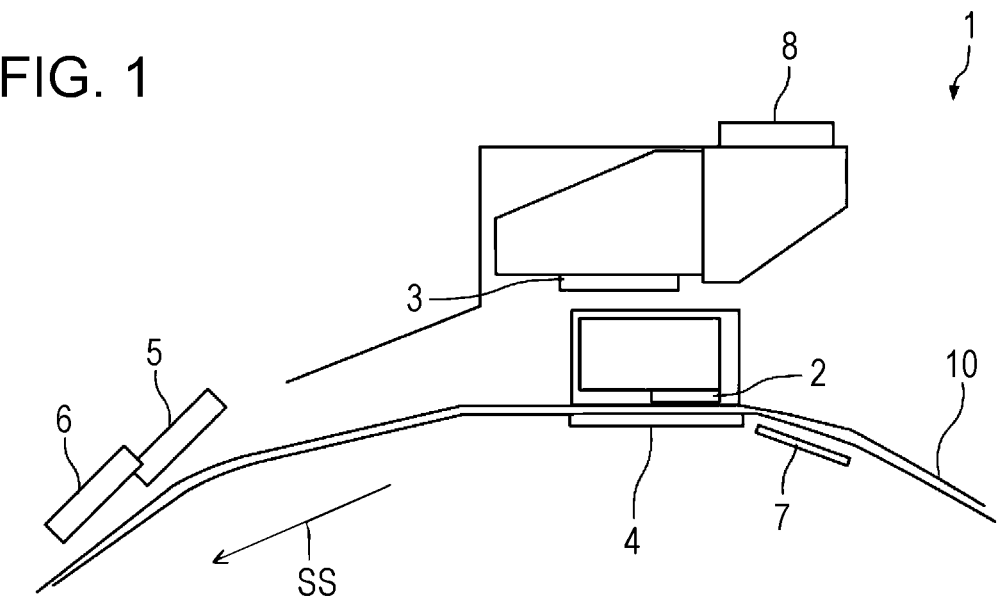
FIG. 1 is an outline sectional view schematically illustrating an ink jet recording apparatus.

Hereinafter, some embodiments of the present disclosure will be described. The embodiments described below are intended to explain examples of the present disclosure. The present disclosure is not limited to the following embodiments and includes various modifications without changing the gist of the present disclosure. Note that all the components described below are not necessarily essential components of the present disclosure.

According to an aspect of an embodiment, an ink treatment solution set includes an ink composition that is a water-based ink jet ink containing a coloring material, and a treatment solution that contains a coagulant, is ejected from an ink jet head, and is used for recording, in which any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m of the dynamic surface tension at 10 ms from a dynamic surface tension of 1000 ms, an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m of the dynamic surface tension at 10 ms from a dynamic surface tension at 1000 ms, and the ink treatment solution set is used for recording on a poorly absorbable recording medium.

According to another aspect of an embodiment, an ink jet recording method includes an ink adhesion step of ejecting an ink composition that is water-based ink jet ink containing a coloring material from an ink jet head and causing the ink composition to adhere to a poorly absorbable recording medium, and a treatment solution adhesion step of ejecting a treatment solution containing a coagulant from the ink jet head and causing the treatment solution to adhere to the poorly absorbable recording medium, in which any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m of the dynamic surface tension at 10 ms from a dynamic surface tension of 1000 ms, and an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m of the dynamic surface tension at 10 ms from a dynamic surface tension at 1000 ms.

According to another aspect of an embodiment, an ink jet recording apparatus includes an ink jet head including an ink ejection nozzle group that ejects an ink composition that is a water-based ink jet ink containing a coloring material and causes the ink composition to adhere to a poorly absorbable recording medium and a treatment solution ejection nozzle group that ejects a treatment solution containing a coagulant and causes the treatment solution to adhere to the poorly absorbable recording medium, in which any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m of the dynamic surface tension at 10 ms from a dynamic surface tension at 1000 ms, and an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m of the dynamic surface tension at 10 ms from a dynamic surface tension at 1000 ms.

In these, above the difference of the dynamic surface tension at 10 ms from a dynamic surface tension at 1000 ms means under formula.

$$A = B - C.$$

A: the difference of the dynamic surface tension at 10 ms from a dynamic surface tension at 1000 ms
B: the dynamic surface tension at 10 ms
C: a dynamic surface tension at 1000 ms It is also described as a difference between the dynamic surface tension at 10 ms and a dynamic surface tension at 1000 ms in this specification before and after. But a difference between the dynamic surface tension at 10 ms and a dynamic surface tension at 1000 ms means the difference of the dynamic surface tension at 10 ms from a dynamic surface tension at 1000 ms.

Hereinafter, the ink treatment solution set, the ink jet recording method, and the ink jet recording apparatus according to the embodiments will be described in an order of the ink jet recording apparatus, an ink jet head, an ink composition, a treatment solution, a poorly absorbable recording medium, and the ink jet recording method.

1. Respective Components 1.1 Ink Jet Recording Apparatus

An example of the ink jet recording apparatus that performs the ink jet recording method according to the embodiment will be described with reference to drawings.

Figure 2:
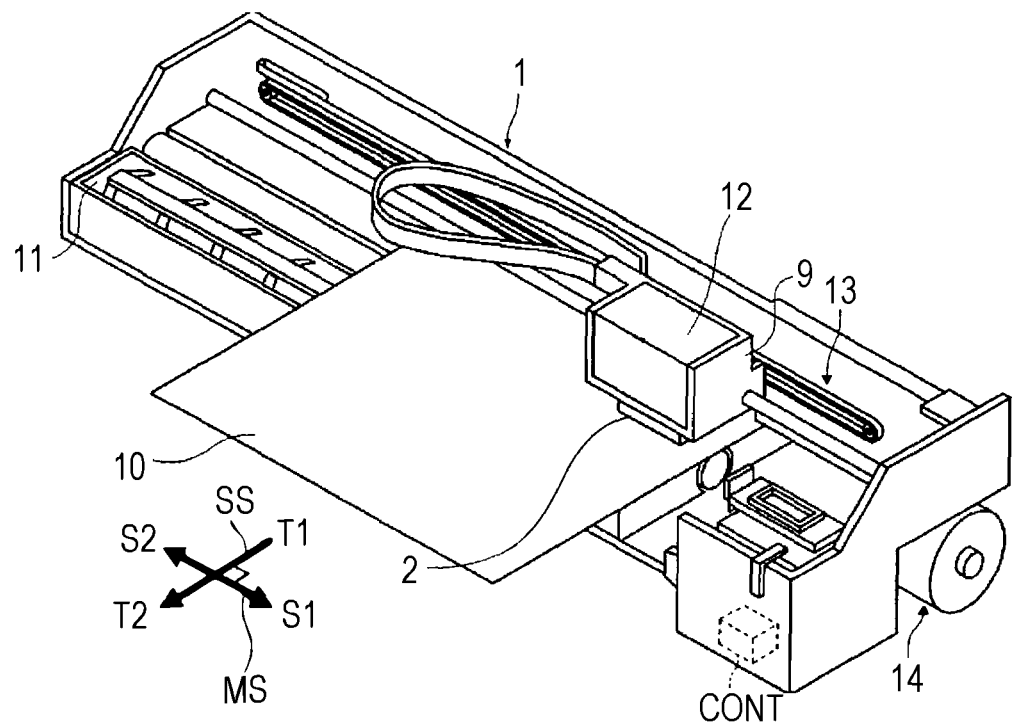
FIG. 2 is a perspective view illustrating an example of a configuration in the surroundings of a carriage in the ink jet recording apparatus in FIG. 1.

FIG. 1 is an outline sectional view schematically illustrating the ink jet recording apparatus. FIG. 2 is a perspective view illustrating an example of a configuration in the surroundings of a carriage in an ink jet recording apparatus 1 in FIG. 1. As illustrated in FIGS. 1 and 2, the ink jet recording apparatus 1 includes an ink jet head 2, an IR heater 3, a platen heater 4, a heating heater 5, a cooling fan 6, a preheater 7, a ventilation fan 8, a carriage 9, a platen 11, a carriage moving mechanism 13, a transport section 14, and a control unit CONT. Overall operations of the ink jet recording apparatus 1 are controlled by the control unit CONT illustrated in FIG. 2.

The ink jet head 2 is a section that performs recording on a poorly absorbable recording medium 10 by ejecting an ink composition and a treatment solution for coagulating constituents of the ink composition from nozzles (not illustrated) and causing the ink composition and the treatment solution to adhere thereto. In the embodiment, the ink jet head 2 is an ink jet head of a serial recording scheme and causes the ink composition and the treatment solution to adhere to the recording medium 10 by performing main scanning a plurality of times along a main scanning axis relative to the recording medium 10.

The ink jet head 2 is mounted on the carriage 9 illustrated in FIG. 2. The ink jet head 2 is scanned a plurality of times along the main scanning axis relative to the recording medium 10 through movement of the carriage 9, that is, an operation of the carriage moving mechanism 13 that moves the carriage 9 in a medium width direction of the recording medium 10, that is, along the main scanning axis. The scanning along the main scanning axis will also be referred to as main scanning.

Here, the main scanning axis is an axis represented by the arrow MS in FIG. 2. Performing the scanning a plurality of times along the main scanning axis means both scanning of the ink jet head 2 in a direction from S1 to S2 of the main scanning axis MS and scanning in a direction from S2 to S1. Therefore, the direction from S1 o S2 and the direction from S2 to S1, in which the carriage 9 with the ink jet head 2 mounted thereon moves, will collectively be referred to as a main scanning direction. That is, the main scanning direction is a direction in which the carriage 9 with the ink jet head 2 moves.

An axis that intersects with the main scanning axis will be referred to as a sub-scanning axis, and the sub-scanning axis is an axis represented by the arrow SS in FIG. 2. That is, the direction of T1→T2, which is a width direction of the recording medium 10, is the sub-scanning direction SS. Note that scanning on any one side in the main scanning direction, that is, in left and right directions of the ink jet recording apparatus 1 is performed in scanning performed once. The main scanning of the ink jet head 2 and the sub-scanning for transporting the recording medium 10 are alternately repeated, thereby performing recording on the recording medium 10.

A method that is known in the related art can be used for ejection from the ink jet head 2. In the embodiment, a scheme in which liquid droplets are ejected using vibration of a piezoelectric element, that is, an ejection scheme in which ink droplets are formed through mechanical deformation of an electrostrictive element is used.

The ink jet recording apparatus 1 includes an IR heater 3, the platen heater 4, and the ventilation fan for heating the recording medium 10 when the ink composition and the treatment solution are ejected from the ink jet head 2, that is, for primary heating or primary drying. In the embodiment, at least one of the IR heater 3, the platen heater 4, and the ventilation fan may be used when the recording medium 10 is heated in an ink adhesion step, which will be described later.

When the IR heater 3 is used, it is possible to heat the recording medium 10 from the side of the ink jet head 2. Thus, although the ink jet head 2 is also likely to be heated at the same time, it is possible to raise the temperature without being affected by the thickness of the recording medium 10 as compared with a case in which the recording medium 10 is heated from the rear surface thereof with the platen heater 4 or the like. Also, when the platen heater 4 is used to heat the recording medium 10, it is possible to heat the recording medium 10 from the side opposite to the side of the ink jet head 2. In this manner, the ink jet head 2 is relatively unlikely to be heated. Meanwhile, when blowing is performed with the ventilation fan, it is possible to promote evaporation of ink constituents, and drying is likely to advance, which is preferable. Although blowing of warm air is preferably performed, air at an ordinary temperature is also preferable since it is possible to promote evaporation of the ink constituents. These are examples of the heating mechanism.

Note that, an upper limit of the surface temperature of the recording medium 10 when the treatment solution and the ink are caused to adhere thereto is preferably equal to or less than 45° C., is more preferably equal to or less than 40° C., is further preferably equal to or less than 38° C., and is particularly preferably equal to or less than 35° C. Also, a lower limit of the surface temperature of the recording medium 10 is preferably equal to or greater than 25° C., is more preferably equal to or greater than 28° C., is further preferably equal to or greater than 30° C., and is particularly preferably equal to or greater than 32° C.

Even when the recording medium is heated with the heating mechanism, less or no radiant heat is received from the IR heater 3, the platen heater 4, and the like by the temperature being equal to or less than the aforementioned range, it is thus possible to curb drying and a variation in compositions of the ink composition and the treatment solution inside the ink jet head 2 or in the vicinity of the nozzles, and welding adhesion of the ink composition and the treatment solution constituents to an inner wall of the ink jet head 2 and an increase in viscosity and solidification thereof in the vicinity of the nozzles are curbed. It is possible to fix the ink composition and the treatment solution in an early stage and to improve image quality.

The heating heater 5 is a heating mechanism for drying and solidifying the ink composition and the treatment solution adhering to the recording medium 10, that is, for secondary heating or secondary drying. By the heating heater 5 heating the recording medium 10 with an image recorded thereon, water content and the like contained in the ink composition and the treatment solution are quickly evaporated and fly, and a resin contained in the ink forms an ink film. In this manner, the ink film is firmly fixed or adheres to the recording medium 10, excellent film forming properties are achieved, and an image with excellent high quality is obtained in a short time. An upper limit of the surface temperature of the recording medium 10 heated by the heating heater 5 is preferably equal to or less than 120° C., is more preferably equal to or less than 100° C., and is further preferably equal to or less than 90° C. Also, a lower limit of the surface temperature of the recording medium 10 is preferably equal to or greater than 60° C., is more preferably equal to or greater than 70° C., and is further preferably equal to or greater than 80° C. By the temperature being within the aforementioned range, an image with high quality is obtained in a short time.

The ink jet recording apparatus 1 may have a cooling fan 6. It is possible to form an ink coated film on the recording medium 10 with satisfactory adhesiveness by drying the ink composition recorded on the recording medium 10 and then cooling the ink composition on the recording medium 10 with the cooling fan 6.

The ink jet recording apparatus 1 may include the preheater 7 that preheats the recording medium 10 before the ink composition and the treatment solution are caused to adhere to the recording medium 10. Further, the ink jet recording apparatus 1 may include the ventilation fan 8 for more efficiently drying the ink composition and the treatment solution adhering to the recording medium 10.

The platen 11 to which the recording medium 10 is transported, the carriage moving mechanism 13 that causes the carriage 9 to move relative to the recording medium 10, and the transport section 14 that is a roller for transporting the recording medium 10 in the sub-scanning direction are provided below the carriage 9. The carriage moving mechanism 13 is a scanning section that scans the ink jet head 2 in the main scanning direction. Operations of the carriage moving mechanism 13 and the transport section 14 are controlled by the control unit CONT.

1.2. Ink Jet Head

As described above, the ink jet head 2 ejects the ink composition and the treatment solution and causes the ink composition and the treatment solution to adhere to the recording medium 10 while moving in the main scanning direction with the movement of the carriage 9 in the embodiment. In this manner, recording is performed by scanning the ink jet head 2 in the main scanning direction relative to the recording medium 10 a plurality of times in the embodiment.

In the embodiment, the cartridge 12 that supplies the ink composition and the treatment solution to the ink jet head 2 includes a plurality of independent cartridges. The cartridge 12 is detachably attached to the carriage 9 with the ink jet head 2 mounted thereon. The plurality of cartridges are filled with different types of ink compositions and treatment solutions, respectively, and the ink compositions and the treatment solutions are supplied to the respective nozzles from the cartridge 12. Note that although the example in which the cartridge 12 is attached to the carriage 9 is described in the embodiment, the embodiment is not limited thereto, and a form in which the cartridge 12 is provided at a location other than the carriage 9 and the ink compositions and the treatment solutions are supplied to the respective nozzles through supply tubes (not illustrated) may also be employed.

Figure 3:
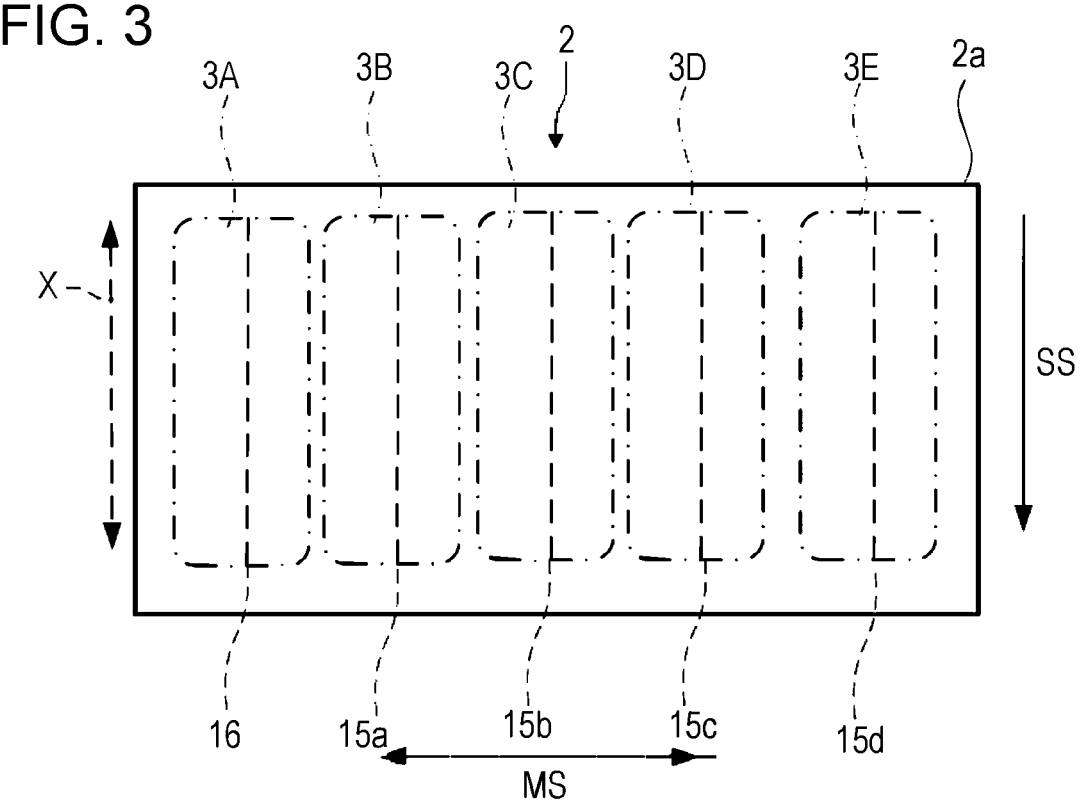
FIG. 3 is an outline top view schematically illustrating an example of alignment of nozzle groups in an ink jet head.

FIG. 3 schematically illustrates an example of alignment of nozzle groups in a nozzle surface 2a in the ink jet head 2. The ink jet head 2 has the nozzle surface 2a including a plurality of nozzles for ejecting the ink composition and the treatment solution. In the example illustrated in FIG. 3, a plurality of ink nozzle groups 15a to 15d, in which a plurality of nozzles to be filled with the ink are aligned in the sub-scanning direction, and a treatment solution nozzle group 16 in which a plurality of nozzles to be filled with the treatment solution are aligned in the sub-scanning direction are included in the nozzle surface 2a of the ink jet head 2. The number of treatment solution nozzle groups 16 may be one or more, and in the example illustrated in FIG. 3, the number of treatment solution nozzle groups 16 is one. In FIG. 3, MS represents the main scanning direction. In the embodiment, a part of the ink nozzle groups, which is used for recording and ejects the ink during the recording, will be referred to as an ink ejection nozzle group. Similarly, a part of the treatment solution nozzle group, which is used for recording and ejects the treatment solution during the recording, will be referred to as a treatment solution ejection nozzle group.

In the embodiment, the treatment solution nozzle group 16 and the ink nozzle groups 15a to 15d have parts, the positions of which overlap with each other in the sub-scanning direction, in the example of the alignment of the nozzle groups illustrated in FIG. 3. Here, the overlapping part corresponds to the range represented by X in FIG. 3 and indicates the length in the sub-scanning direction represented by X that coincides in a region 3A in which the treatment solution nozzle group 16 is present and regions 3B to 3E in which the ink nozzle groups 15a to 15d are present. In the example illustrated in FIG. 3, the overlapping part corresponds to 100% of the length of the treatment solution nozzle group 16 in the sub-scanning direction and corresponds to 100% of the lengths of the ink nozzle groups 15a to 15d in the sub-scanning direction. In this manner, the nozzle groups used corresponds to 100% with respect to the respective nozzle groups, and when the overlapping part Y corresponds to 100% alignment, it is possible to cause the treatment solution and the ink to adhere at the same time in scanning performed once and thereby to achieve a high recording speed. Also, since the nozzle groups user are transversely aligned, it is possible to reduce the sizes of the ink jet head 2, the carriage 9, and the like.

In the example illustrated in FIG. 3, all the ink nozzle groups 15a to 15d are ink ejection nozzle groups, and the entire treatment solution nozzle group is a treatment solution ejection nozzle group. Therefore, in the example of the alignment of the nozzle groups illustrated in FIG. 3, the ink ejection nozzle groups and the treatment solution ejection nozzle group 16 have the overlapping part X when the ink nozzle groups 15a to 15d that are ink ejection nozzle groups and the treatment solution ejection nozzle group that is the treatment solution ejection nozzle group 16 are projected along the main scanning axis MS. More specifically, the overlapping part X is included along a sub-scanning axis SS that intersects with the main scanning axis MS.

Figure 4:
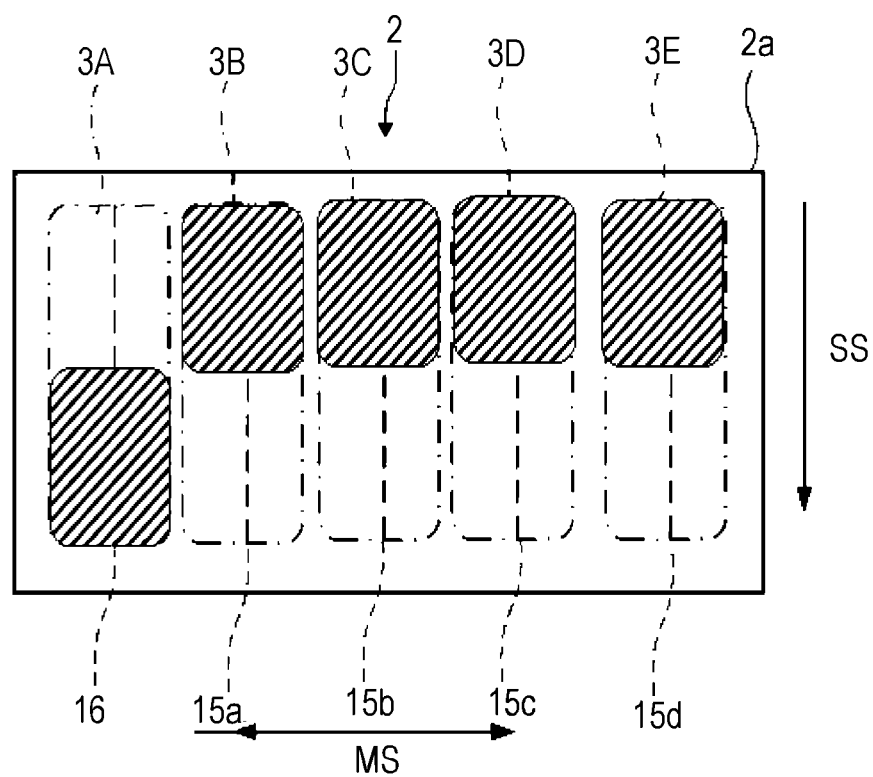
FIG. 4 is an outline top view schematically illustrating an example of alignment of ejection nozzle groups in the ink jet head.

FIG. 4 illustrates an example in which the treatment solution nozzle group 16 located only upstream in the sub-scanning direction is used as a treatment solution ejection nozzle group as described above, and the ink nozzle groups 15a to 15d located only downstream in the sub-scanning direction are used as ink ejection nozzle groups in the example of the alignment of the nozzle groups illustrated in FIG. 3. Here, the hatched portion of the treatment solution nozzle group 16 located downstream in the sub-scanning direction is not used for recording, and the non-hatched side located upstream is used as the treatment solution ejection nozzle group for recording. Also, the hatched portions of the ink nozzle groups 15a to 15d located upstream in the sub-scanning direction are not used for recording, and the non-hatched portions located downstream are used as the ink ejection nozzles for recording. The treatment solution ejection nozzle group and the ink ejection nozzle groups are nozzle groups at the intermediate part in the sub-scanning direction including the nozzle located most upstream and the nozzle located most downstream in the sub-scanning direction from among nozzles used for recording in the treatment solution nozzle group and the ink nozzle groups.

In this manner, it is possible to use the treatment solution nozzle group 16 located only upstream in the sub-scanning direction for recording and to cause the treatment solution nozzle group 16 only upstream in the sub-scanning direction to eject the treatment solution during the recording. Such a part that is used for recording and ejects the treatment solution during the recording in the treatment solution nozzle group will be referred to as a treatment solution ejection nozzle group. Also, it is possible to use the ink nozzle groups 15a to 15d located only downstream in the sub-scanning direction and to cause the ink nozzle groups 15a to 15d located only downstream in the sub-scanning direction to eject ink during the recording.

In this scheme, the overlapping part between the treatment solution nozzle group 16 and the ink nozzle groups 15a to 15d corresponds to 100% while an overlapping part between the treatment solution ejection nozzle group and the ink ejection nozzle groups actually used corresponds to 0%. In this scheme, only the treatment solution is caused to adhere to the recording medium first in main scanning performed once, and after the man scanning, the ink is caused to adhere to the same position in main scanning. Since the ink is caused to adhere in a state in which all the necessary amount of treatment solution has already adhered, the ink reliably comes into contact with the treatment solution on the recording medium, and this leads to a sufficient reaction and thus improved image quality. Meanwhile, since only a half of the nozzles in the ink jet head 2 is used, the recording speed becomes slow. The example in FIG. 4 is the same as FIG. 3 except for this point.

Figure 5:
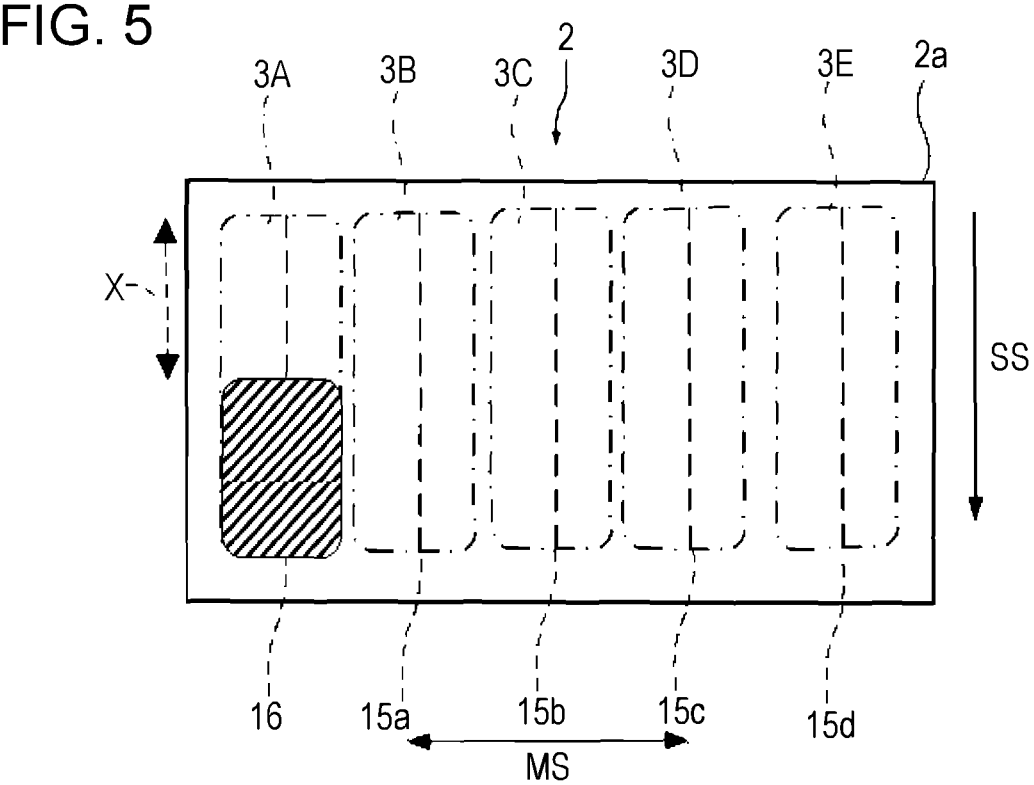
FIG. 5 is an outline top view schematically illustrating another example of alignment of the ejection nozzle groups in the ink jet head.

FIG. 5 illustrates an example in which the treatment solution nozzle group 16 located only upstream in the sub-scanning direction is used as a treatment solution ejection nozzle group as described above and all the ink nozzle groups 15a to 15d are used as the ink ejection nozzle groups in the example of the alignment of the nozzle groups illustrated in FIG. 3. The hatched portion of the treatment solution nozzle group 16 located downstream in the sub-scanning direction is not used for recording, and the non-hatched portion located upstream is used as the treatment solution ejection nozzle group used for the recording. The overlapping part of the treatment solution ejection nozzle group and the ink ejection nozzle group in the sub-scanning direction is X.

In this manner, the treatment solution nozzle group 16 located only upstream in the sub-scanning direction can be used for recording and be caused to eject the treatment solution, and all the nozzles in the ink nozzle groups 15a to 15d can be used for recording and be caused to eject the ink. In this scheme, the overlapping part between the treatment solution nozzle group 16 and the ink nozzle groups 15a to 15d corresponds to 100% while the overlapping part between the treatment solution ejection nozzle group and the ink ejection nozzle groups actually used corresponds to 50% of the ink nozzle groups and corresponds to 100% of the treatment solution nozzle group. In this scheme, the recording speed that is the same as that of the aforementioned scheme in which the entire treatment solution nozzle group 16 is filled with the treatment solution is achieved. Meanwhile, although image quality is more likely to be obtained than in the aforementioned scheme in which the entire treatment solution nozzle group 16 is filled with the treatment solution, image quality is more unlikely to be obtained than in the example in FIG. 7, which will be described later. FIG. 5 is the same as FIG. 3 except for this point.

Figure 6:
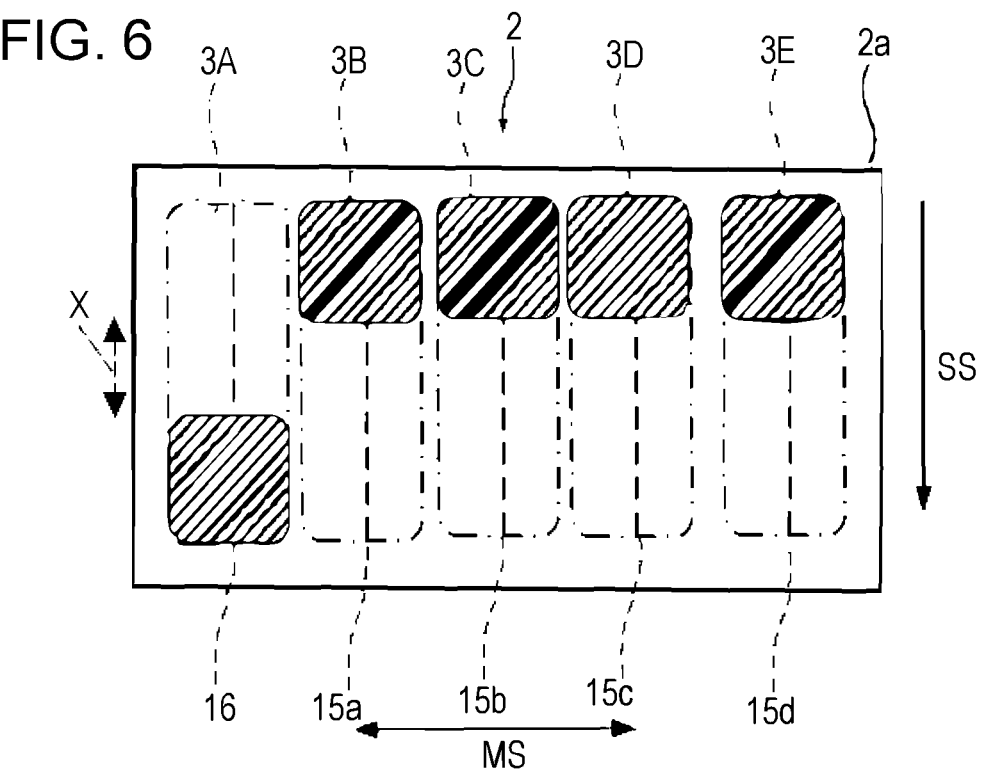
FIG. 6 is an outline top view schematically illustrating yet another example of alignment of the ejection nozzle groups in the ink jet head.

FIG. 6 illustrates an example in which two third of the treatment solution nozzle group 16 located upstream in the sub-scanning direction is used as the treatment solution ejection nozzle group, and two third of the ink nozzle groups 15a to 15d located downstream in the sub-scanning direction is used as the ink ejection nozzle group in the example of the alignment of the nozzle groups illustrated in FIG. 3. The hatched portion of the treatment solution nozzle group 16 located downstream in the sub-scanning direction is not used for recording, and the non-hatched portion located upstream is used as the treatment solution ejection nozzle group used for the recording. Also, the hatched portions of the ink nozzle groups 15a to 15d located upstream in the sub-scanning direction are not used for recording, and the non-hatched portions located downstream are used as the ink ejection nozzles for recording. The overlapping part of the treatment solution ejection nozzle group and the ink ejection nozzle group in the sub-scanning direction is X. In this scheme, although the overlapping part between the treatment solution nozzle group 16 and the ink nozzle groups 15a to 15d corresponds to 100%, the overlapping part between the treatment solution ejection nozzle group and the ink ejection nozzle groups actually used corresponds to 50% of the ink ejection nozzle groups and corresponds to 50% of the treatment solution ejection nozzle group. The example in FIG. 6 is the same as FIG. 3 except for this point.

A ratio of a length of a part, in which the treatment solution ejection nozzle group and the ink ejection nozzle groups overlap with each other in the sub-scanning direction, in the processing solution ejection nozzle group, that is, the ratio of the length of the overlapping part will be referred to as an overlapping rate of the treatment solution ejection nozzle group. A ratio of a length of a part, in which the treatment solution ejection nozzle group and the ink ejection nozzle groups overlap in the sub-scanning direction, in the ink ejection nozzle groups, that is, the ratio of the length of the overlapping part will be referred to as an overlapping rate of the ink ejection nozzle groups.

In FIG. 3, the treatment solution nozzle group and all the ink nozzle groups are used as the treatment solution ejection nozzle group and the ink ejection nozzle group for recording, and both the rates of utilization of the treatment solution nozzle group and the ink nozzle groups are 100%. Also, both the overlapping rate of the treatment solution ejection nozzle group and the ink ejection nozzle groups are 100%. The overlapping rates of the ejection nozzle groups are not limited to those illustrated in FIGS. 3 to 6 and can be equal to or greater than 0% and equal to or less than 100%. When the overlapping rates are adjusted, the rate of utilization of the treatment solution nozzle group and the rate of utilization of the ink nozzle groups may be respectively adjusted. When the rate of utilization is less than 100%, the treatment solution ejection nozzle group is preferably set from the treatment solution nozzle group located upstream in the sub-scanning direction, and the ink ejection nozzle groups are preferably set from the ink nozzle groups located downstream in the sub-scanning direction. That is, when a part that is not the overlapping part, that is, a non-overlapping part is included in the treatment solution ejection nozzle group, the non-overlapping part is preferably included further upstream than the overlapping part in the sub-scanning direction. Also, when a part that is not the overlapping part, that is, a non-overlapping part is included in the ink ejection nozzle groups, the non-overlapping part is preferably included further downstream than the overlapping part in the sub-scanning direction for more excellent image quality.

Here, the case in which the overlapping ratio of the position overlapping part in the sub-scanning direction is 100% corresponds to a case in which all the treatment solution nozzle group 16 and the ink nozzle groups 15a to 15d are used in the example of the alignment of the nozzle groups illustrated in FIG. 3. Also, the expression that the overlapping ratio of the position overlapping part of the treatment solution ejection nozzle group in the sub-scanning direction is 60% means that the overlapping part of the treatment solution ejection nozzle group and the ink ejection nozzle group in the sub-scanning direction for the treatment solution ejection nozzle group and the ink ejection nozzle groups that are actually used for recording from among the treatment solution nozzle group 16 and the ink nozzle groups 15a to 15d is 60% of the length of the treatment solution ejection nozzle group in the sub-scanning direction. The overlapping rate of the aforementioned position overlapping part in the sub-scanning direction in the treatment solution ejection nozzle group is preferably equal to or greater than 60%, is more preferably equal to or greater than 80%, and is further preferably equal to or greater than 90%.

In order to adjust the overlapping rate in this manner, it is only necessary to adjust the rate of utilization of the treatment solution nozzle group and the rate of utilization of the ink nozzle groups.

The rate of utilization of the ink nozzle groups is a rate of utilization represented by Equation (1) below:

The rate of utilization (%)=(the length of the ink ejection nozzle groups in the sub-scanning direction/the length of the ink nozzle groups in the sub-scanning direction)×100   (1)

The rate of utilization of the treatment solution nozzle group is a rate of utilization represented by Equation (2) below:

The rate of utilization (%)=(the length of the treatment solution ejection nozzle group in the sub-scanning direction/the length of the treatment solution nozzle group in the sub-scanning direction)×100   (2)

When the treatment solution ejection nozzle group and the ink ejection nozzle groups are set using the disposition of the treatment solution nozzle group and the ink nozzle groups in FIG. 3, the overlapping rate of the treatment solution ejection nozzle group becomes 60%, and the overlapping ratio of the ink ejection nozzle groups becomes 60% by setting the rate of utilization of the treatment solution nozzle group to 80% from the side located upstream in the sub-scanning direction and setting the rate of utilization of the ink nozzle groups to 80% from the side located downstream in the sub-scanning direction. The rate of utilization of the ink nozzle groups is preferably higher in terms of a high printing speed ratio, is preferably equal to or greater than 60%, is more preferably equal to or greater than 80%, and is further preferably equal to or greater than 90%. Also, the rate of utilization of the treatment solution nozzle group is preferably higher in terms of a high printing speed ratio, is preferably equal to or greater than 60%, is more preferably equal to or greater than 80%, and is further preferably equal to or greater than 90%.

FIG. 7 schematically illustrates another example of alignment of nozzle groups. In the example illustrated in FIG. 7, the nozzle surface 20a of the ink jet head 20 has a plurality of ink nozzle groups 25a to 25d, in each of which a plurality of nozzles to be filled with the ink are aligned in the sub-scanning direction, and a treatment solution nozzle group 26 in which a plurality of nozzles to be filled with the treatment solution are aligned in the sub-scanning direction. The treatment solution nozzle group 26 has a part, the position of which overlaps with the positions of the ink nozzle groups 25a to 25d in the sub-scanning direction. Here, the overlapping part corresponds to a range represented by Y in FIG. 7 and indicates the length in the sub-scanning direction represented by Y that coincides in a region 4A in which the treatment solution nozzle group 26 is present and regions 4B to 4E in which the ink nozzle groups 25a to 25d are present.

In the example illustrated in FIG. 7, the overlapping part Y is about two third of the length of the treatment solution nozzle group 26 in the sub-scanning direction and is about two third of the length of the ink nozzle groups 25a to 25d in the sub-scanning direction. When the overlapping part Y corresponds to a part in this manner, it is possible to cause the treatment solution and a part of the ink to adhere at the same time in one scanning operation. Therefore, the length of one nozzle group in the sub-scanning direction is shorter than that in the example in FIG. 3, and the recording speed is higher than that in the example in FIG. 3. Meanwhile, since the ink is caused to adhere after the treatment solution adhering to the recording medium 10 is dried to some extent, the ink sufficiently react with the treatment solution on the recording medium 10, and image quality tends to be improved in the example illustrated in FIG. 7. The overlapping part Y is preferably equal to or greater than two third of the treatment solution nozzle group. Since the overlapping part Y is preferably equal to or greater than two third of the in nozzle groups such that the apparatus math ratio is low.

Note that in the example illustrated in FIG. 7, all the ink nozzle groups 25a to 25d are ink ejection nozzle groups, and the entire treatment solution nozzle group 26 is a treatment solution ejection nozzle group. Therefore, in the example of the alignment of the nozzle groups illustrated in FIG. 7, the ink ejection nozzle groups and the treatment solution ejection nozzle group have an overlapping part Y along the sub-scanning axis SS that intersects the main scanning axis MS when the ink nozzle groups 25a to 25d that are ink ejection nozzle groups and the treatment solution nozzle group that is the treatment solution ejection nozzle group 26 are projected along the main scanning axis MS.

In this example, since the treatment solution nozzle group 26 is disposed further upstream than the ink nozzle groups 25a to 25d, the apparatus including the ink jet head 2, the carriage 9, and the like tends to increase in size in the sub-scanning direction as compared with that in FIG. 3 when the length of the nozzle groups in the sub-scanning direction is the same as the length of the nozzle groups illustrated in FIG. 3 described above. Therefore, in the example illustrated in FIG. 7, the length of the overlapping part Y is preferably equal to or greater than 80%, is more preferably equal to or greater than 85%, and is further preferably equal to or greater than 90% of the length of the ink nozzle groups 25a to 25d in the sub-scanning direction. The length of the overlapping part Y is preferably equal to or greater than 80%, is more preferably equal to or greater than 85%, and is further preferably equal to or greater than 90% of the length of the treatment solution nozzle group 26 in the sub-scanning direction. Also, the length of the overlapping part Y is preferably equal to or greater than 80%, is more preferably equal to or greater than 85%, and is further preferably equal to or greater than 90% of the length of the ink nozzle groups in the sub-scanning direction.

Further, in the example of the treatment solution nozzle group 26 and the ink nozzle groups 25a to 25d illustrated in FIG. 7, all the nozzle groups may not be used as ejection nozzle groups for recording, and some of the nozzle groups may be used as ejection nozzle groups for recording as in FIGS. 4 to 6.

1.3. Ink Composition

Next, an ink composition that is a water-based ink jet ink used in the ink jet recording method according to the embodiment (hereinafter, also referred to as "water-based ink" or "ink") will be described.

The water-based ink jet ink used in the embodiment is included in an ink treatment solution set according to the embodiment along with the treatment solution containing a coagulant, and the ink treatment solution set contains water as a main constituent.

Here, the ink jet ink is the ink composition used for a recording method based on the ink jet method. The "water-based" composition means a composition containing water as one main solvent. The content of water in the ink composition is preferably equal to or greater than 40% by mass, is further preferably equal to or greater than 45% by mass, is more preferably equal to or greater than 50% by mass, and is particularly preferably equal to or greater than 60% by mass. Ink compositions that have similar basic compositions other than that color phase angles differ due to a difference in types of coloring material used and/or the contents of coloring material used differ and color concentrations in inks differ can be exemplified.

In the embodiment, the ink composition may or may not contain an organic solvent, and the content of the organic solvent in the ink composition will be described later. The ink composition can contain a coloring material, a resin, a wax, an antifoaming agent, and a surfactant as needed.

Hereinafter, constituents that are or can be contained in the water-based ink jet ink used in the embodiment will be described. The water-based ink jet ink used in the embodiment is adapted such that the ink composition has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and the dynamic surface tension at 1000 ms, and a treatment solution, which will be described later, has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and the dynamic surface tension at 1000 ms, or the ink composition has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and the dynamic surface tension at 1000 ms, and the treatment solution has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and the dynamic surface tension at 1000 ms.

1.3.1. Water

In the embodiment, the ink composition contains water. Water is a main medium in the water-based ink jet ink and is a constituent that is evaporated and flies due to drying. Water is preferably pure water or ultrapure water from which ionic impurities have been removed to the maximum extend, such as ion exchanged water, ultra-filtrated water, reverse osmosis water, and distilled water. Water sterilized through ultraviolet irradiation, addition of hydrogen peroxide, or the like is preferably used since it is possible to curb generation of mold and bacteria when the ink composition is preserved for a long period of time.

The content of water is preferably equal to or greater than 40% by mass, is further preferably equal to or greater than 45% by mass, is more preferably equal to or greater than 50% by mass, and is particularly preferably equal to or greater than 60% by mass with respect to the total mass of the ink composition.

1.3.2. Coloring Material

In the embodiment, the ink composition may be color ink containing a coloring material. Also, a plurality of color inks may be used, or a clear ink that does not contain a coloring material may also be used.

Both a dye and a pigment can be used as coloring materials. A pigment is preferably used due to characteristics that the discoloration is unlikely occur with respect to light, gas, and the like. An image formed on a recording medium using a pigment has not only excellent image quality but also excellent water resistance, gas resistance, light resistance, and the like and satisfactory preservation properties. The characteristics significantly appear when the image is formed on a poorly absorbable recording medium such as an ink low-absorbable or non-absorbable recording medium, in particular.

Although pigments that can be used in the embodiment are not particularly limited, examples thereof include inorganic pigments and organic pigments. As the inorganic pigment, it is possible to use carbon black manufactured by a known method such as a contact method, a furnace method, or a thermal method in addition to titanium oxide and iron oxide. Meanwhile, as an organic pigment, an azo pigment, a polycyclic pigment, a nitro pigment, a nitroso pigment, aniline black, or the like can be used, for example. Examples of the azo pigment include azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, and a quinophthalone pigment.

Examples of pigments that are used for black ink from among specific examples of the pigment that can be used in the embodiment include carbon black. Although the carbon black is not particularly limited, examples thereof include furnace black, lamp black, acetylene black, cannel black, and the like (C.I. Pigment black 7), and commercially available products thereof include No. 2300, 900, MCF88, No. 20B, No. 33, No. 40, No. 45, No. 52, MA7, MA8, MA77, MA100, No. 2200B, and the like (all of which are names of products manufactured by Mitsubishi Chemical Corporation), Color Black FW1, FW2, FW2V, FW18, FW200, 5150, 5160, 5170, Printex 35, U, V, 140U, Special Black 6, 5, 4A, 4, 250, and the like (all of which are name of products manufactured by Degussa AG), Conductex SC, Raven 1255, 5750, 5250, 5000, 3500, 1255, 700, and the like (all of which are names of products manufactured by Columbia Carbon), Regal 400R, 330R, 660R, Mogul L, Monarch 700, 800, 880, 900, 1000, 1100, 1300, 1400, Elftex 12, and the like (all of which are names of products manufactured by Cabot Japan KK).

Although pigments that are used for white ink are not particularly limited, examples thereof include white inorganic pigments such as C.I. Pigment white 6, 18, and 21, titanium oxide, zinc oxide, zinc sulfide, antimony oxide, magnesium oxide, and zirconium oxide. Other than the white inorganic pigments, it is also possible to use white organic pigments such as fine hollow resin particles and polymer particles of a white color.

Although pigments that are used for yellow ink are not particularly limited, examples thereof include C.I. Pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Although pigments that are used for magenta ink are not particularly limited, examples thereof include C.I. Pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment violet 19, 23, 32, 33, 36, 38, 43, and 50.

Although pigments that are used for cyan ink are not particularly limited, examples thereof include C.I. Pigment blue 1, 2, 3, 15, 15:1, 15:2, 15:3, 15:34, 15:4, 16, 18, 22, 25, 60, 65, and 66, and C.I. Vat blue 4 and 60.

Although pigments that are used for color ink other than magenta, cyan, and yellow are not particularly limited, examples thereof include C.I. Pigment green 7 and 10, C.I. Pigment brown 3, 5, 25, and 26, C.I. Pigment orange 1, 2, 5, 7, 13, 14, 15, 16, 24, 34, 36, 38, 40, 43, and 63.

Although pearl pigments are not particularly limited, examples thereof include pigments that have pearly glossiness or interference glossiness such as titanium dioxide-coated mica, fish scales, and bismuth oxychloride.

Although metallic pigments are not particularly limited, examples thereof include particles made of aluminum, silver, gold, platinum, nickel, chromium, tin, zinc, indium, titanium, or copper alone or alloys thereof.

A lower limit value of the content of the coloring material that can be contained in the color ink is preferably equal to or greater than 0.5% by mass, is more preferably equal to or greater than 1% by mass, and is further preferably equal to or greater than 3% by mass with respect to the total mass of the ink composition. Meanwhile, an upper limit value of the content of the coloring material that can be contained in the color ink is preferably equal to or less than 10% by mass, is more preferably equal to or less than 7% by mass, and is further preferably equal to or less than 6% by mass with respect to the total mass of the ink composition. By the content of the coloring material falling within the aforementioned range, an image formed on a recording medium has excellent water resistance, gas resistance, light resistance, and the like and satisfactory ink preservation properties.

When the coloring material is a pigment, it is possible to use the pigment in a state of a pigment dispersion. As a method of dispersing the pigment, a dispersant that allows pigment particles to have dispersibility can be used. The pigment dispersion may contain a solvent as needed in addition to the pigment and the dispersant. Examples of the solvent include hydrophilic solvents such as water and diethylene glycol. Examples of the dispersant include a styrene-acrylic acid copolymer. Although an acid value of the dispersant is not particularly limited, the acid value of the dispersant is preferably equal to or greater than 20 mgKOH/g in terms of dispersibility.

When a clear ink is used as the ink composition, the content of the coloring material for the clear ink is preferably equal to or less than 0.2% by mass, is more preferably equal to or less than 0.1% by mass, and is further preferably equal to or less than 0.05% by mass, and an upper limit of the content may be 0% by mass in the embodiment. Note that the clear ink is not ink used for coloring a recording medium and is ink used for other purposes. Although other purposes include an improvement in properties such as rubbing resistance of a recorded product and the like, adjustment of glossiness of the recording medium, and an improvement in fixability and coloring properties of the color ink, other purposes are not limited thereto. The clear ink is not a treatment solution, which will be described later, and does not contain a coagulant.

1.3.3. Organic Solvent

In the embodiment, the ink composition preferably contains an organic solvent. By the ink composition containing an organic solvent, excellent clogging resistance is achieved during recording. By the ink composition containing the organic solvent, satisfactory drying properties of the ink composition ejected onto the recording medium is achieved, and it is possible to obtain an image with excellent image quality and rubbing resistance.

The organic solvent used for the ink composition is preferably a water-soluble organic solvent. By using the water-soluble organic solvent, more satisfactory drying properties of the ink are achieved, and it is possible to obtain an image with excellent image quality and rubbing resistance.

Although the water-soluble organic solvent is not particularly limited, examples thereof include alkanediols, polyols, nitrogen-containing solvent, esters, glycol esters, and cyclic esters.

Examples of alkanediols include 1,2-pentanediol, 1,2-hexanediol, 1,2-octanediol, which are 1,2-alkanediols, and 1,6-hexanediol. One kind of these can be used alone, or two or more kinds can be mixed and used. Alkanediols have an excellent effect of enhancing wettability of the ink composition with respect to the recording medium and uniformly wetting the recording medium and have an excellent effect as a penetrating solvent with respect to the recording medium. Among these, 1,2-alkanediols, in particular, have an excellent effect as a penetrating solvent and are preferably used. Preferable examples of alkanediols include dial of alkane having 5 or more carbon atoms. The number of carbons in alkane is preferably five to nine, and either linear or branched alkane may be used. The content of alkane diols in the ink is preferably equal to or greater than 1% by mass and equal to or less than 20% by mass, is more preferably equal to or greater than 1.5% by mass and equal to or less than 15% by mass, and is further preferably equal to or greater than 2% by mass and equal to or less than 10% by mass.

Examples of polyols include ethylene glycol, propylene glycol, 1,2-propanediol, 1,2-butanedol, 1,3-propanediol, 1,4-butanediol, diethylene glycol, triethylene glycol, dipropylene glycol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin. One kind of these can be used alone, or two or more kinds can be mixed and used. Polyols have an excellent effect as a moisturizer. Preferable examples of polyols include alkane that has 2 or more hydroxyl groups and has 4 or less carbon atoms and alkane that has 2 or more hydroxyl groups and has 4 or less carbon atoms, in which the hydroxyl groups have caused intermolecular condensations, and the number of condensations is preferably 2 to 4. Here, polyols are compounds that have 2 or more hydroxyl groups in a molecule, and the number of hydroxyl groups is preferably 2 or 3 in the embodiment. The content of polyols in the ink is preferably equal to or greater than 1% by mass and equal to or less than 30% by mass, is more preferably equal to or greater than 2% by mass and equal to or less than 20% by mass, and is further preferably equal to or greater than 3% by mass and equal to or less than 10% by mass.

Examples of the nitrogen-containing solvent include pyrrolidones such as N-methyl-2-pyrrolidone, N-ethyl-2-pyrrolidone, N-vinyl-2-pyrrolydone, 2-pyrrolidone, N-butyl-2-pyrrolidone, and 5-methyl-2-pyrrolidon. One kind of these can be used alone, or two or more kinds can be mixed and used. The nitrogen-containing solvent has an affect as a satisfactory solubilizer for a resin and makes it possible to obtain a recorded product with excellent rubbing resistance and to prevent clogging of the ink jet head and the nozzles.

It is also possible to exemplify alkoxyalkylamides as the nitrogen-containing solvent, and examples thereof include 3-methoxy-N,N-dimethylpropioneamide, 3-methoxy-N,N-diethylpropioneamide, 3-methoxy-N,N-methylethylpropioneamide, 3-ethoxy-N,N-dimethylpropioneamide, 3-ethoxy-N,N-diethylpropioneamide, 3-ethoxy-N,N-methylethylpropioneamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-iethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

As the nitrogen-containing solvent, it is also possible to exemplify amide-based solvents. As the amide-based solvents, cyclic amide-based solvents and non-cyclic amide-based solvents are exemplified and are preferably used. As the cyclic amide-based solvents, the aforementioned pyrrolidones are exemplified. As the non-cyclic amide-based solvents, the aforementioned alkoxyalkylamides are exemplified.

The content of the nitrogen-containing solvent in the ink composition is preferably equal to or greater than 3% by mass and equal to or less than 30% by mass, is more preferably equal to or greater than 5% by mass and equal to or less than 25% by mass, and is preferably equal to or greater than 10% by mass and equal to or less than 20% by mass. The ink preferably contains the nitrogen-containing solvent in terms of more excellent rubbing resistance, image quality, and the like.

Examples of esters include: glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxy butyl acetate; and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

As glycol ethers, monoether or diether of alkylene glycol may be used, and alkyl ether is preferably used. Specific examples thereof include: alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monomethyl ether, triethylene glycol monobutyl ether, tetraethylene glycol monomethyl ether, tetraethylene glycol monoethyl ether, tetraethylene glycol monobutyl ether, propylene glycol monoethyl ether, propylene glycol monopropyl ether, propylene glycol monobutyl ether, dipropylene glycol monomethyl ether, dipropylene glycol monoethyl ether, dipropylene glycol monoethyl ether, dipropylene glycol monopropyl ether, dipropylene glycol monobutyl ether, and tripropylene glycol monobutyl ether; and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether. These can control wettability of the ink composition with respect to the recording medium.

Among the aforementioned glycol ethers, dieter tends to easily cause the resin in the ink to be dissolved or swell as compared with monoether and is preferably used in order to improve rubbing resistance of an image formed. The content of the glycol ethers in the ink is preferably equal to or greater than 1% by mass and equal to or less than 30% by mass, is more preferably equal to or greater than 2% by mass and equal to or less than 20% by mass, and is further preferably equal to or greater than 3% by mass and equal to or less than 10% by mass.

Examples of the cyclic esters include cyclic esters (lactones) such as β-propiolactone, γ-butyrolactone, δvalerolactone, εcaprolactone, β-butyrolactone, β-valerolactone, γ-valerolactone, β-hexanolactone, γ-hexanolactone, δhexanolactone, β-heptanolactone, γ-heptanolactone, δheptanolactone, ε-heptanolactone, γ-octanolactone, δoctanolactone, εoctanolactone, δnonalactone, εnonalactone, and εdecanolactone, and compounds thereof in which hydrogen of a methylene group that is adjacent to a carbonyl group is substituted with an alkyl group having 1 to 4 carbon atoms.

The content of the organic solvent is preferably equal to or greater than 1% by mass, is preferably equal to or greater than 3% by mass, is more preferably equal to or greater than 5% by mass, is further preferably equal to or greater than 10% by mass, and is particularly preferably equal to or greater than 15% by mass with respect to the total mass of the ink composition. The content of the organic solvent is preferably equal to or less than 40% by mass, is more preferably equal to or less than 35% by mass, and is further preferably equal to or less than 30% by mass with respect to the total mass of the ink composition. Further, the content of the organic solvent is more preferably equal to or less than 25% by mass and is particularly preferably equal to or less than 23% by mass. When the content of the organic solvent falls within the aforementioned range, the ink composition has more excellent clogging resistance and rubbing resistance, which is preferable.

A standard boiling point of the organic solvent is preferably equal to or greater than 180° C., is more preferably equal to or greater than 200° C., and is further preferably equal to or greater than 210° C. Also, the standard boiling point of the organic solvent is preferably equal to or less than 300° C., is preferably equal to or less than 280° C., is more preferably equal to or less than 270° C., an is further preferably equal to or less than 250° C. When the standard boiling point of the organic solvent falls within the aforementioned range, the ink composition has more excellent clogging resistance and rubbing resistance, which is preferable.

Note that since a polyol-based organic solvent with a standard boiling point of greater than 280° C., such as triethylene glycol or glycerin, functions as a moisturizer, drying of the ink jet head is curbed, and excellent clogging resistance is achieved by containing the polyol-based organic solvent. Meanwhile, the polyol-based organic solvent with a standard boiling point of greater than 280° C. may absorb water content in the ink composition, and increase the viscosity of the ink near the ink jet head, or degrade drying properties of the ink when the polyol-based organic solvent adheres to the recording medium. Therefore, the content of the polyol-based organic solvent with a standard boiling point of greater than 280° C. in the ink composition is preferably equal to or less than 3.0% by mass, is more preferably equal to or less than 2.0% by mass, is more preferably equal to or less than 1.0% by mass, is further preferably equal to or less than 0.8% by mass, and is particularly preferably equal to or less than 0.1% by mass with respect to the total mas of the ink composition in the embodiment. In this case, since high drying properties of the ink composition on the recording medium are achieved, the ink composition is suitable for recording on a poorly absorbable recording medium, in particular, and an image with excellent rubbing resistance is obtained. Further, the content of not only polyols but also the organic solvent with a standard boiling point of greater than 280° C. is preferably set within the aforementioned range for obtaining an image with excellent rubbing resistance.

1.3.4. Resin

In the embodiment, the ink composition preferably contains a resin. The resin has an effect of solidifying the ink composition and further firmly fixing the ink solidified substance on the recording medium. In the embodiment, the resin may be either in a state in which the resin is dissolved in the ink composition or in a state in which the resin is dispersed in the ink composition. As the resin in the dissolved state, the aforementioned resin dispersant that is used when the pigment is dispersed in the ink can be used. As the resin in the dispersed state, it is possible to cause a resin with poor solubility or a resin that is insoluble to be contained in a solution medium of the ink in a fine particle form, that is, in an emulsion state or in a suspension state.

Although the resin that is used in the embodiment is not particularly limited, examples thereof include an acrylic resin, a vinyl acetate resin, a vinyl chloride resin, a butadiene resin, a styrene resin, a polyester resin, a crosslinked acrylic resin, a crosslinked styrene resin, a benzoguanamine resin, a phenol resin, a silicone resin, an epoxy resin, a urethane resin, a paraffin resin, a fluorine resin, a water-soluble resin, and copolymers as combinations of monomers included in these resins. Although the copolymers are not particularly limited, examples thereof include a styrene butadiene resin and a styrene acrylic resin. As the resin, it is possible to use a polymer latex containing such a resin. Examples thereof include a polymer latex containing fine particles of an acrylic resin, a styrene acrylic resin, a styrene resin, a crosslinked acrylic resin, and a crosslinked styrene resin. Note that one kind of the resins may be used alone or two or more kinds thereof may be used together.

The acrylic resin is a resin that is a homopolymer or a copolymer obtained by causing polymerization using at least an acryl-based monomer as a monomer. Examples of the acryl-based monomer include (meth)acrylate, (meth)acrylic acid, acrylamide, and acrylonitrile. When the acrylic resin is a copolymer, an acryl-vinyl resin and the like using a vinyl-based monomer as another monomer is exemplified, and in particular, a styrene acryl resin and the like using styrene as a vinyl-based monomer is exemplified. Among these resins, an acryl resin, a urethane resin, a polyester resin, and the like are preferably used since it is possible to easily obtain the acrylic resin, the urethane resin, the polyester resin, and the like as resins with desired properties.

A lower limit of the total content of the resin is preferably equal to or greater than 1% by mass, is more preferably equal to or greater than 2% by mass, and is further preferably equal to or greater than 3% by mass with respect to the total mass of the ink composition in terms of solid content. An upper limit of the content of the resin is preferably equal to or less than 15% by mass, is more preferably equal to or less than 10% by mass, and is further preferably equal to or less than 7% by mass with respect to the total mass of the ink composition. By the content of the resin falling the aforementioned range, it is possible to secure clogging resistance during recording and to form an image with excellent rubbing resistance even on a poorly absorbable recording medium.

1.3.5. Surfactant

In the embodiment, the ink composition preferably contains a surfactant. Although the surfactant is not particularly limited, examples thereof include an acetylene glycol-based surfactant, a fluorine-based surfactant, and silicone-based surfactant, at least one kind thereof is preferably contained, and among these, an acetylene glycol-based surfactant or a silicone-based surfactant is more preferably contained. By the ink composition containing the acetylene glycol-based surfactant or the silicone-based surfactant, it is possible to lower the dynamic surface tension of the ink and to improve clogging resistance.

Although the acetylene glycol-based surfactant is not particularly limited, examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all of which are names of products manufactured by Air Products Japan KK), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all of which are names of products manufactured by Nisshin Chemical Co., Ltd.), and Acetylenol E00, E00P, E40, and E100 (all of which are names of products manufactured by Kawaken Fine Chemicals Co., Ltd.).

Although the silicone-based surfactant is not particularly limited, preferable examples thereof include a polysiloxane-based compound. Although the polysiloxane-based compound is not particularly limited, examples thereof include polyether-modified organosiloxane. Examples of commercially available products of the polyether-modified organosiloxane include BYK-306, BYK-307, BYK-333, BYK-341, BYK-345, BYK-346, and BYK-348 (all of which are names of products manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of which are names of products manufactured by Shin-etsu Chemical Co., Ltd.), and Silface SAG503A and Silface SAG014 (all of which are names of products manufactured by Shin-etsu Chemical Co., Ltd.).

As the fluorine-based surfactant, a fluorine-modified polymer is preferably used, and specific examples thereof include BYK-340 (a name of a product manufactured by BYK Japan KK).

When the surfactant is contained, the content is preferably equal to or greater than 0.1% by mass and equal to or less than 1.5% by mass with respect to the total mass of the ink composition.

1.3.6. Wax

In the embodiment, the ink composition may contain a wax. As the wax, a wax dissolved in the ink composition or a wax dispersed in the form of fine particles such as an emulsion is exemplified. By using such a wax, a recorded product with more excellent rubbing resistance tends to be obtained. By the wax is localized on the surface of an ink coated film on the recording medium, that is, on an interface between air and the ink coated film, in particular, the wax tends to contribute to an improvement in rubbing resistance. Although such a wax is not particularly limited, examples thereof include an ester wax of a higher fatty acid and a higher monovalent alcohol or divalent alcohol, a paraffin wax, a microcrystalline wax, a polyolefin wax, or mixtures thereof.

Examples of the polyolefin wax include waxes manufactured from olefin such as ethylene, propylene, or butylene or derivatives thereof and copolymers thereof, specifically, a polyethylene-based wax, a polypropylene-based wax, and a polybutylene-based wax. Commercially available polyolefin wax can be used, and specific examples thereof that can be used include Nopcote PEM17 (a name of a product manufactured by San Nopco Limited), Chemipearl W4005 (a name of a product manufactured by Mitsui Chemicals, Inc.), AQUACER515 and AQUACER593 (all of which are names of products manufactured by BYK Japan KK).

The content of the wax is preferably equal to or greater than 0.1% by mass and equal to or less than 5% by mass, is more preferably equal to or greater than 0.2% by mass and equal to or less than 4% by mass, and is further preferably equal to or greater than 0.3% by mass and equal to or less than 3% by mass with respect to the total mass of the ink composition. The content of the wax preferably falls within the aforementioned range since rubbing resistance is improved, the viscosity of the ink decreases, and excellent ejection stability and clogging recovery properties are achieved.

1.3.7. Antifoaming Agent

Although the antifoaming agent is not particularly limited, examples thereof include a silicone-based antifoaming agent, a polyether-based antifoaming agent, a fatty acid ester-based antifoaming agent, and an acetylene glycol-based antifoaming agent. Examples of commercially available antifoaming agents include BYK-011, BYK-012, BYK-017, BYK-018, BYK-019, BYK-020, BYK-021, BYK-022, BYK-023, BYK-024, BYK-025, BYK-028 BYK-038, BYK-044, BYK-080A, BYK-094, BYK-1610, BYK-1615, BYK-1650, BYK-1730, and BYK-1770 (all of which are names of products manufactured by BYK Japan KK), and Surfynol DF37, DF110D, DF58, DF75, DF220, MD-20, and EnviroGem AD01 (all of which are names of products manufactured by Nisshin Chemical Co., Ltd.). One kind of the antifoaming agent may be used alone, or two or more kinds thereof may be mixed and used.

The content of the antifoaming agent is preferably equal to or greater than 0.03% by mass and equal to or less than 0.7% by mass, is more preferably equal to or greater than 0.05% by mass and equal to or less than 0.5% by mass, and is further preferably equal to or greater than 0.08% by mass and equal to or less than 0.3% by mass.

1.3.8. Other Contained Constituents

In the embodiment, it is possible to appropriately add various additives such as a solubilizing aid, a viscosity adjuster, a pH adjuster, an antioxidant, a preservative, an antifungal agent, a corrosion inhibitor, a moisturizer that is not an organic solvent, and a chelating agent for capturing metal ions that affect dispersion in order to satisfactorily maintain preservation stability thereof and ejection stability of the ink jet head, in order to improve clogging, or in order to prevent the ink from being degraded.

1.3.9. Method for Preparing Ink Composition

In the embodiment, the ink is obtained by mixing the aforementioned constituents in an arbitrary order and performing filtration as needed to remove impurities. As a method for mixing the respective constituents, a method of sequentially adding materials to a container provided with a stirring device such as a mechanical stirrer or a magnetic stirrer and stirring and mixing the materials is preferably used. As a filtration method, centrifugal filtration, filter filtration, or the like can be performed as needed.

1.3.10. Physical Properties of Ink Composition

In the embodiment, the surface tension (static surface tension) at 20° C. is preferably equal to or greater than 18 mN/m and equal to or less than 40 mN/m, is more preferably equal to or greater than 20 mN/m and equal to or less than 35 mN/m, and is further preferably equal to or greater than 22 mN/m and equal to or less than 33 mN/m in terms of a balance between image quality and reliability as the ink for ink jet recording. Note that for the measurement of the surface tension, it is possible to perform the measurement by checking the surface tension when a platinum plate is wetted with the ink in an environment at 20° C. using an automatic surface tension meter CBVP-Z (a name of a product manufactured by Kyowa Interface Science, Inc.), for example.

When the treatment solution, which will be described later, has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and a dynamic surface tension at 1000 ms in the embodiment, the ink composition has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension at 1000 ms.

Alternatively, when the treatment solution, which will be described later, has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension at 1000 ms, the ink composition has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and a dynamic surface tension at 1000 ms. The differences between the dynamic surface tensions at 10 ms and the dynamic surface tensions at 1000 ms of the treatment solution and the ink composition, that is, a variation widths of the dynamic surface tensions are also width of decreases in the dynamic surface tensions from 10 ms to 1000 ms.

For measurement of the dynamic surface tension of the ink, it is possible to perform the measurement using a "bubble pressure dynamic surface tension meter BP-2", which is a name of a product that is a dynamic surface tension meter using principles of a bubble pressure method, namely, a maximum bubble pressure method, for example, manufactured by KRUSS. The measurement is performed at an ordinary temperature and is performed at 25° C., for example. The dynamic surface tension of the ink can be adjusted by adjusting the type and the content of the surfactant of the organic solvent, for example, among the aforementioned constituents.

That is, any of the treatment solution and the ink composition has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension at 1000 ms, and the other one has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and a dynamic surface tension at 1000 ms.

The aforementioned any one of them preferably has a dynamic surface tension of equal to or greater than 32.5 mN/m, more preferably has a dynamic surface tension of equal go or greater than 33.0 mN/m, and further preferably has a dynamic surface tension of equal to or greater than 35.5 mN/m at 10 ms. In this case, more excellent reduction of coagulation irregularity is achieved, which is preferable. Alternatively, the dynamic surface tension at 10 ms is preferably equal to or less than 35.5 mN/m, is more preferably equal to or less than 35.0 mN/m, and is further preferably equal to or less than 34.5 mN/m. Further, the dynamic surface tension at 10 ms is further preferably equal to or less than 32.5 mN/m. In this case, more excellent reduction of pinholes is achieved, which is preferable.

The aforementioned any one of them preferably has a difference between the dynamic surface tension at 10 ms and the dynamic surface tension at 1000 ms, namely a variation width of the dynamic surface tension of equal to or greater than 6.5 mN/m, more preferably has a variation width of equal to or greater than 7.0 mN/m, and is further preferably has a variation width of equal to or greater than 7.5 mN/m. In this case, more excellent reduction of coagulation irregularity is achieved, which is preferable. Alternatively, the variation width of the dynamic surface tension is preferably equal to or less than 9.5 mN/m, is more preferably equal to or less than 9.0 mN/m, and is further preferably equal to or less than 8.5 mN/m. In this case, more excellent reduction of pinholes is achieved, which is preferable.

The aforementioned other one of them preferably has a dynamic surface tension of equal to or greater than 34.8 mN/m, more preferably has a dynamic surface tension of equal to or greater than 35.0 mN/m, and further preferably has a dynamic surface tension surface of equal to or greater than 35.2 mN/m at 10 ms. In this case, more excellent reduction of coagulation irregularity is achieved, which is preferable. Alternatively, the dynamic surface tension of the ink composition at 10 ms is preferably equal to or less than 36.3 mN/m, is more preferably equal to or less than 36.1 mN/m, and is further preferably equal to or less than 35.8 mN/m. In this case, more excellent reduction of pinholes is achieved, which is preferable.

The aforementioned other one of them preferably has a difference between the dynamic surface tension at 10 ms and the dynamic surface tension at 1000 ms, that is a variation width of the dynamic surface tension of equal to or greater than 8.2 mN/m, more preferably has a variation width of equal to or greater than 8.4 mN/m, and further preferably has a variation width of equal to or greater than 8.6 mN/m. In this case, more excellent reduction of coagulation irregularity is achieved, which is preferable. Alternatively, the variation width of the dynamic surface tension is preferably equal to or less than 9.8 mN/m, is more preferably equal to or less than 9.6 mN/m, and is further preferably equal to or less than 9.4 mN/m. In this case, more excellent reduction of pinholes is achieved, which is preferable.

When the dynamic surface tensions of the ink composition and the treatment solution are excessively higher than the predetermined ranges, droplets of the ink and the treatment solution cannot wet the recording medium and spread thereon, filling is degraded, and pinholes are generated. Meanwhile, when the dynamic surface tensions are excessively lower than the predetermined ranges, the droplets excessively wet the recording medium and excessively spread thereon, adjacent dots are located closer to each other, and the droplets causing bleeding and thus leads to coagulation irregularity. In a case of a recording method using the treatment solution and the ink composition, in particular, the number of these droplets to be caused to adhere to the recording medium increases, and the droplets are more likely to come into contact with each other, are more likely to be located closer to each other, and are more likely cause bleeding. When the droplets of the treatment solution of the ink composition excessively come into contact with each other, the coagulant contained in the treatment solution is excessively diluted, and it is also considered that efficiency of the reaction with the ink composition is rather degraded. In particular, a serial printer causes the droplets to adhere by performing scanning a plurality of times on the same region on the recording medium, there is a case in which how coagulation irregularity occurs slightly differs for each scanning operation, and the coagulation irregularity tends to appear as streaks in the main scanning direction and become noticeable.

Further, 1 second, namely 1000 ms after the droplets adhere to the recording medium is a time in which mixing dots of the ink and the treatment solution, the reaction of which have advanced to some extent, further spread, sufficient filling is achieved, and a final image is obtained. When the surface tensions of the treatment solution and the ink at this time decrease by predetermined ranges from those at 10 ms, sufficient filling is obtained. In this manner, the trend of the decrease in dynamic surface tensions of the treatment solution and the ink in this stage is considered to affect the state of the filling in the final image. Also, when the variation widths of the dynamic surface tension are within the predetermined ranges, excessive spreading of droplets that leads to coagulation irregularity does not occur, more excellent image quality is achieved, and neither poor filling of the image nor generation of pinholes occur.

In this manner, the wettability of the ink with respective to the poor absorbable recording medium is set to be in an appropriate range, pinholes, coagulation irregularity, and the like are curbed, and image quality is thus improved by the dynamic surface tensions of the ink composition and the treatment solution being in the aforementioned relationship in the embodiment. Further, rubbing resistance of the obtained image is also improved.

Note that the aforementioned any of the treatment solution and the ink composition has a slight difference in a variation width between the range of the dynamic surface tension at 10 ms and the dynamic surface tension at 1000 ms. Any one of the treatment solution and the ink composition has a relatively low dynamic surface tension at 10 ms and has a relatively small variation width at 1000 ms. The other one has a relatively high dynamic surface tension at 10 ms and has a relatively large variation width at 1000 ms. In the embodiment, such setting is preferably employed.

Since the droplets caused to adhere to the recording medium are the treatment solution and the ink composition, and an image is formed of both the treatment solution and the ink composition, either the ink composition or the treatment solution may be either the one or the other one, and both can be the one. Also, although the variation widths between the dynamic surface tensions at 10 ms and the dynamic surface tensions at 1000 ms of the one and the other one may be the same as one another or may be different from each other, a fact that reduction of pinholes and reduction of coagulation irregularity are controlled with a satisfactory balance by the variation widths of both the one and the other one being set within predetermined ranges is inferred.

The variation widths between the range of the dynamic surface tension at 10 ms and the dynamic surface tension at 1000 ms of the treatment solution and the ink composition are preferably within the ranges of the aforementioned one and the other one from the point that it is easy to adjust the variation width between the range of the dynamic surface tension at 10 ms and the dynamic surface tension at 1000 ms of the treatment solution and the ink composition.

In the embodiment, the difference between the dynamic surface tensions of the ink composition and the treatment solution at 10 ms may be 0 mN/m, is preferably equal to or greater than 0.2 mN/m, is preferably equal to or greater than 0.3 mN/m, is more preferably equal to or greater than 0.5 mN/m, is further preferably equal to or greater than 0.8 mN/m, and is particularly preferably equal to or greater than 1.0 mN/m. Further, the difference is preferably equal to or greater than 2.5 mN/m, is preferably equal to or greater than 3 mN/m, and is preferably equal to or greater than 3.5 mN/m. In this case, more excellent reduction of pinholes is achieved, which is preferable.

Alternatively, the difference between the dynamic surface tensions of the ink composition and the treatment solution at 10 ms is preferably equal to or less than 4.5 mN/m, is more preferably equal to or less than 4.0 mN/m, is further preferably equal to or less than 3.5 mN/m, and is particularly preferably equal to or less than 3.0 mN/m. Further, the difference is preferably equal to or less than 2.5 mN/m, is preferably equal to or less than 2 mN/m, is preferably equal to or greater than 1.5 mN/m, and is preferably equal to or greater than 1 mN/m. In this case, more excellent reduction of coagulation irregularity is achieved, which is preferable.

Since the treatment solution and the ink composition contain mutually different constituents, there may be a case in which it is necessary to individually adjust the dynamic surface tensions. It is preferable that there is a difference between the dynamic surface tensions at 10 ms, and the difference preferably falls within the aforementioned range from the point that it is easy to individually adjust the dynamic surface tensions to correspond to either the aforementioned one or the other one.

When the dynamic surface tension is adjusted by lowering the dynamic surface tension from a dynamic surface tension of water, which is a main solvent of the composition, using a surfactant, for example, the content of the surfactant may affect the composition. In such a case, the content of the surfactant is preferably relatively small, and in this manner, the dynamic surface tension at 10 ms becomes relatively high. In that case, since the entire ink composition and the treatment solution have well-balanced dynamic surface tensions, the composition that is not the aforementioned composition with a relatively higher dynamic surface tension at 10 ms preferably has a relatively low dynamic surface tension at 10 ms. When such a point is taken into consideration, the dynamic surface tensions of the aforementioned one and the other one are preferably satisfied.

For example, the content of the surfactant in the ink composition is preferably low from the point that dispersion stability of constituents contained in the composition in the dispersed form is not degraded. In this regard, the dynamic surface tension of the ink composition at 10 ms is preferably relatively high from the point that it is possible to set the content of the surfactant required to adjust the dynamic surface tension of the ink composition to be relatively low. Therefore, the ink composition is preferably the aforementioned the other one. That is, the dynamic surface tension of the ink composition at 10 ms is preferably higher than that of the treatment solution.

The dynamic surface tensions of the ink composition and the treatment solution can be adjusted by adjusting the type and the content of the surfactant, for example, although the adjusting method is not limited thereto. The dynamic surface tensions can be adjusted mainly by a molecular weight of the surfactant to be contained. As the molecular weight of the surfactant is lower, the moving speed thereof in a liquid is higher, orientation is more likely occur, the surface tension is thus more likely to be equal to the static surface tension in a shorter time, and it is possible to set the dynamic surface tension at 10 ms to be relatively low. In this case, it is possible to set the variation width of the dynamic surface tension at 1000 ms by the dynamic surface tension at 10 ms being low. Meanwhile, as the molecular weight of the surfactant is larger, it is possible to set the dynamic surface tension of the liquid to be relatively large. In this case, it is possible to set the variation width of the dynamic surface tension at 1000 ms to be large.

Two or more kinds of surfactant may be used. In this case, it is easy to adjust the degree of the dynamic surface tension at 10 ms and the variation width of the dynamic surface tension at 1000 ms with the respective two or more surfactants, which is preferable. Further, the dynamic surface tension is easily adjusted by adjusting a mass ratio of the contents of the two or more kinds of surfactant.

As the surfactant, any of an acetylene glycol-based surfactant, a fluorine-based surfactant, and a silicone-based surfactant is preferably used from the point that these surfactants have a high effect of lowering the surface tension of the liquid. In particular, either the fluorine-based surfactant or the silicone-based surfactant is preferably used.

Also, organic modified substances thereof are preferably used from the point that it is easy to adjust the molecular weights and to acquire the organic modified substances. Examples of the organic modified bodies include a polyether-modified substance and a polyester-modified substance, and the polyether-modified substance is preferably used in terms of the aforementioned point.

The content of the surfactant in the ink composition or the treatment solution is preferably equal to or greater than 0.1% by mass and equal to or less than 4% by mass, is more preferably equal to or greater than 0.2% by mass and equal to or less than 2.5% by mass, is further preferably equal to or greater than 0.3% by mass and equal to or less than 2% by mass, is more preferably equal to or greater than 0.4% by mass and equal to or less than 1.5% by mass, and is more preferably equal to or greater than 0.5% by mass and equal to or less than 1% by mass with respect to the total mass of the ink composition or the treatment solution. In particular, the content of the surfactant in the ink composition is preferably lower than the content of the surfactant in the treatment solution. The content of the surfactant in the ink composition is preferably equal to or less than 1.0% by mass, is more preferably equal to or less than 0.9% by mass, is further preferably equal to or less than 0.8% by mass, and is particularly preferably equal to or less than 0.7% by mass with respect to the total mass of the ink composition. The content of the surfactant in the treatment solution is preferably equal to or greater than 0.9% by mass, is more preferably equal to or greater than 1.0% by mass, and is further preferably equal to or greater than 1.1% by mass with respect to the total mass of the treatment solution.

Further, it is also possible to set the dynamic surface tension at 10 ms to be low by containing the aforementioned organic solvent in the composition. The dynamic surface tension of the composition at 10 ms may be adjusted by adjusting the type and the content of the organic solvent.

In the embodiment, the viscosity of the ink at 20° C. is preferably equal to or greater than 3 mPa·s and equal to or less than 10 mPa·s and is more preferably equal to or greater than 3 mPa·s and equal to or less than 8 mPa·s from the viewpoint of a balance between image quality and reliability as ink for ink jet recording. For the measurement of the viscosity, the viscosity in an environment at 20° C. can be measured using a viscoelasticity tester MCR-300 (a name of a product manufactured by Physica), for example.

1.4. Treatment Solution

Next, the treatment solution used in the ink jet recording method according to the embodiment will be described.

The treatment solution used in the embodiment is included in the ink treatment solution set according to the embodiment along with the aforementioned ink composition.

In the embodiment, the treatment solution is a composition for coagulating the constituents of the ink composition and is preferably a composition containing a coagulant for coagulating the constituents of the ink composition. The constituents of the ink that react with the treatment solution include a coloring material, a resin, and the like. In the treatment solution, the content of the aforementioned coloring material is equal to or less than 0.2% by mass, is preferably equal to or less than 0.1% by mass, and is more preferably equal to or less than 0.05% by mass, and a lower limit thereof is 0% by mass. The treatment solution is an aid solution used by being caused to adhere to the recording medium before or after ink adhesion or at the same time with the ink instead of the aforementioned ink itself used for coloring the recording medium.

Simultaneous adhesion of the ink and the treatment solution means that the ink and the treatment solution are caused to adhere to a predetermined region on the recording medium in the same scanning. The predetermined region is, for example, a band region extending in the main scanning direction of the recording medium and having a predetermined width in the sub-scanning direction. That is, this corresponds to a case in which the ink ejection nozzle groups and the treatment solution ejection nozzle group have an overlapping part along the sub-scanning axis when the aforementioned ink ejection nozzle groups and the treatment solution ejection nozzle group are projected along the main scanning axis.

For the treatment solution, inclusion of constituents that may be contained therein other than the aforementioned coloring material of the ink composition, contents thereof, properties, and the like can be adjusted independently from the aforementioned ink composition other than the inclusion of the coagulant. In the embodiment, it is possible to record an image with excellent image quality using the treatment solution. On the other hand, there may be a case in which rubbing resistance and clogging resistance of the obtained image are degraded due to the utilization of the treatment solution.

1.4.1. Coagulant

The treatment solution used in the embodiment preferably contains a coagulant for coagulating the constituents of the ink composition. By the treatment solution containing a coagulant, the coagulant quickly react with the coloring material, the resin, and the like contained in the ink composition in an ink adhesion step, which will be described later. It is thus considered that the dispersed state of the coloring material and the resin in the ink composition breaks and causes coagulation, the coagulated substance inhibit flowing of the coloring material on the recording medium, and an excellent improvement in image quality of the recorded image is thus achieved.

Examples of the coagulant include cationic compounds such as polyvalent metal salts, cationic polymers, and cationic surfactants, and organic acids. One kind of these coagulants may be used alone, or two or more kinds thereof may be used together. Among these coagulants, at least one kind of coagulant selected from a group consisting of a polyvalent metal salt, an organic acid, and a cationic polymer is preferably used in terms of excellent reactivity with the constituents contained in the ink composition.

Examples of the polyvalent metal salts include compounds that include divalent or more polyvalent metal ions and negative ions that are bonded to the polyvalent metal ions and that are soluble in water. Specific examples of the polyvalent metal ions include divalent metal ions such as $Ca^{2+}$, $Cu^{2+}$, $Ni^{2+}$, $Mg^{2+}$, $Zn^{2+}$, and $Ba^{2+}$; and trivalent metal ions such as $Al^{3+}$, $Fe^{3+}$, and $Cr^{3+}$. Examples of the negative ions include $Cl^-$, $I^-$, $Br^-$, $So_4^{2-}$, $ClO^{3-}$, $NO^{3-}$, $HCOO^-$, and $CH_3COO^-$. Among these polyvalent metal salts, a calcium salt and a magnesium salt are preferably used from the viewpoint of stability of the treatment solution and reactivity of the coagulant.

Preferable examples of the organic acids include a phosphoric acid, a polyacrylic acid, an acetic acid, a glycolic acid, a malonic acid, a malic acid, a maleic acid, an ascorbic acid, a succinic acid, a glutaric acid, a fumaric acid, a citric acid, a tartaric acid, a lactic acid, a sulfonic acid, an orthophosphoric acid, a pyrrolidone carboxylic acid, a furancarboxylic acid, a pyridinecarboxylic acid, a coumaric acid, a thiophenecarboxylic acid, a nicotinic acid, or derivatives of these compounds, and salts thereof. One kind of the organic acids may be used alone, or two or more kinds thereof may be used together. Salts of organic acids that are also polyvalent metal salts are assumed to be included in the polyvalent metal salts.

Examples of the cationic polymers include a cationic urethane resin, a cationic olefin resin, a cationic amine-based resin, and a cationic amide-based resin. Any cationic amine-based resin may be used as long as the resin has an amino group, and examples thereof include an allylamine resin, a polyamine resin, and a quaternary ammonium salt polymer. As the polyamine resin, a resin that has an amino group in a main skeleton is exemplified. As the allylamine resin, a resin that has a structure derived from an allyl group in a main skeleton is exemplified. As the quaternary ammonium salt polymer, a resin that has a quaternary ammonium salt in a structure is exemplified. Among the cationic polymers, a cationic amine-based resin is preferably used not only because the cationic amine-based resin has excellent reactivity but also because it is easy to obtain the cationic amine-based resin.

The concentration of the coagulant in the treatment solution is preferably equal to or greater than 0.5% by mass, is more preferably equal to or greater than 1% by mass, and is further preferably equal to or greater than 3% by mass with respect to the total mass of the treatment solution. The concentration of the coagulant in the treatment solution is preferably equal to or less than 20% by mass, is more preferably equal to or less than 15% by mass, and is further preferably equal to or less than 10% by mass with respect to the total mass of the treatment solution.

1.4.2. Water

The treatment solution used in the embodiment is preferably a water-based composition containing water as a main solvent. The water is a constituent that is evaporated and fly due to drying after the treatment solution is caused to adhere to the recording medium. Water is preferably pure water or ultrapure water from which ionic impurities have been removed to the maximum extend, such as ion exchanged water, ultra-filtrated water, reverse osmosis water, and distilled water. Water sterilized through ultraviolet irradiation, addition of hydrogen peroxide, or the like is preferably used since it is possible to curb generation of mold and bacteria when the treatment solution is preserved for a long period of time. The content of water contained in the treatment solution can be equal to or greater than 40% by mass, is preferably equal to or greater than 50% by mass, is more preferably equal to or greater than 60% by mass, and is further preferably equal to or greater than 70% by mass, for example, with respect to the total mass of the treatment solution.

1.4.3. Organic Solvent

The treatment solution used in the embodiment may contain an organic solvent. By the treatment solution containing the organic solvent, it is possible to improve wettability of the treatment solution with respect to the recording medium. As the organic solvent, the organic solvents that are similar to those exemplified above for the ink composition can be used. Although the content of the organic solvent is not particularly limited, the content can be equal to or greater than 10% by mass and equal to or less than 80% by mass, and is preferably equal to or greater than 15% by mass and equal to or less than 70% by mass, for example.

The organic solvent can be contained such that the standard boiling point falls within a preferable range of the standard boiling point of the aforementioned organic solvent that may be contained in the ink composition independently from the standard boiling point of the organic solvent that may be contained in the ink composition. Alternatively, the standard boiling point of the organic solvent is preferably equal to or greater than 180° C., is more preferably equal to or greater than 190° C., and is further preferably equal to or greater than 200° C. Also, the standard boiling point of the organic solvent is preferably equal to or less than 300° C., is more preferably equal to or less than 270° C., and is further preferably equal to or less than 250° C.

As the organic solvent in the treatment solution, the content of polyol-based organic solvent with a standard boiling point of greater than 280° C. is preferably equal to or less than 5.0% by mass, is more preferably equal to or less than 3.0% by mass, is more preferably equal to or less than 2.0% by mass, is further preferably equal to or less than 1.0% by mass, is further preferably equal to or less than 0.8% by mass, and is particularly preferably equal to or less than 0.1% by mass similarly to the aforementioned ink composition. In the aforementioned case, the treatment solution is quickly dried due to satisfactory drying properties of the treatment solution. Also, since the drying properties of the ink composition on the recording medium are enhanced, the ink composition is particularly suitable for recording on a poorly absorbable recording medium, and an image with excellent rubbing resistance is obtained. Further, the content of not only polyols but also the organic solvent with a standard boiling point of greater than 280° C. is preferably set within the aforementioned range for obtaining an image with excellent rubbing resistance.

1.4.4. Surfactant

A surfactant may be added to the treatment solution used in the embodiment. By adding the surfactant thereto, it is possible to reduce the surface tension of the treatment solution and to improve wettability with respect to the recording medium. Among the surfactants, the aforementioned acetylene glycol-based surfactant, silicone-based surfactant, and fluorine-based surfactant, for example, can be preferably used. As specific examples of the surfactants, surfactants that are similar to the aforementioned surfactants exemplified for the ink composition can be used. Although the content of the surfactant is not particularly limited, the content thereof can be equal to or greater than 0.1% by mass and equal to or less than 5.0% by mass with respect to the total mass of the treatment solution.

1.4.5. Other Constituents

The aforementioned pH adjuster, a corrosion inhibitor, an antifungal agent, an anti-rusting agent and a chelating agent may be added as needed to the treatment solution used in the embodiment.

1.4.6. Method for Preparing Treatment Solution

The treatment solution used in the embodiment can be manufactured by dispersing or mixing the aforementioned respective constituents by an appropriate method. A target treatment solution can be obtained by sufficiently stirring the aforementioned respective constituents and performing filtration in order to remove coarse particles and foreign matters that may cause clogging.

1.4.7. Physical Properties of Treatment Solution

When the treatment solution used in the embodiment is ejected using the ink jet head, the surface tension (stationary surface tension) at 20° C. is preferably equal to or greater than 18 mN/m and equal to or less than 40 mN/m, is more preferably equal to or greater than 20 mN/m and equal to or less than 35 mN/m, and is further preferably equal to or greater than 22 mN/m and equal to or less than 33 mN/m. For the measurement of the surface tension, the surface tension can be measured by checking the surface tension when a platinum plate is wetted with the treatment solution in an environment at 20° C. using an automatic surface tension meter CBVP-Z (a name of a product manufactured by Kyowa Interface Science, Inc.), for example.

In the embodiment, the viscosity of the treatment solution at 20° C. is preferably equal to or greater than 3 mPa·s and equal to or less than 10 mPa·s and is more preferably equal to or greater than 3 mPa·s and equal to or less than 8 mPa·s from the viewpoint of a balance between image quality and reliability as a treatment solution for ink jet recording. For the measurement of the viscosity, the viscosity in an environment at 20° C. can be measured using a viscoelasticity tester MCR-300 (a name of a product manufactured by Physica), for example.

1.5. Poorly Absorbable Recording Medium

In the embodiment, pinholes and coagulation irregularity are curbed, and it is possible to obtain an image with excellent image quality and excellent rubbing resistance in recording on a poorly absorbable recording medium such as an ink low-absorbable or non-absorbable recording medium when the ink treatment solution set as a combination of the aforementioned specific ink and the treatment solution is performed for performing recording as will be described later.

As the poorly absorbable recording medium in the embodiment, a "recording medium with the amount of test solution absorbed of equal to or less than 10 mL/m² in 30 msec$^{1/2}$ after the start of contact in the Bristow method" is defined as the poorly absorbable recording medium. In the embodiment, water/1,2-hexanediol=95/5 is used as the test solution. The Bristow method is a method that has most widely been distributed as a method for measuring the amount of solution absorbed in a short period of time and is also employed by JAPAN TAPPI. Details of the test method are described in the standard No. 51 "Paper and plate paper—liquid absorbability test method—Bristow method" of "JAPAN TAPPI Paper pulp test method 2000 version".

In the embodiment, the amount of solution absorbed by the poorly absorbable recording medium is preferably equal to or less than 8.0 mL/m², is more preferably equal to or less than 5.0 mL/m², is further preferably equal to or less than 4.0 mL/m², is particularly preferably equal to or less than 2.0 mL/m², and is more particularly preferably equal to or less than 1.5 mL/m². In the embodiment, pinholes and coagulation irregularity are curbed, and an image with excellent image quality and further excellent rubbing resistance can be obtained even on such a poorly absorbable recording medium with a small amount of solution absorbed since the aforementioned ink treatment solution set is used.

A recording medium with a coated layer for receiving the ink provided on the surface thereof is exemplified as an ink low-absorbable recording medium among poorly absorbable recording media, print papers such as an art paper, a coated paper, and a matte paper are exemplified as recording medium including papers as base materials, and recording media obtained by coating surfaces of polyvinyl chloride, polyethylene terephthalate, polycarbonate, polystyrene, polyurethane, polyethylene, polyethylene, and the like with hydrophilic polymers and recording media obtained by coating the surfaces with particles of silica, titanium, and the like along with a binder are exemplified when the base materials are plastic films.

Among the poorly absorbable recording media, examples of ink non-absorbable recording media include a plastic film on which a surface treatment for ink jet recording has not been performed, that is, on which no ink absorption layer is formed, a recording medium obtained by coating a base material such as a paper with plastic, and a recording medium to which a plastic film has been attached. Examples of the plastic described herein include polyvinyl chloride, polyethylene terephthalate, polycarbonate, polystyrene, polyurethane, polyethylene, and polypropylene.

These recording media may be semi-transparent recording media or transparent recording media. Also, the recording media may be recording media with unevenness provided on surfaces thereof, such as embossed media.

2. Ink jet Recording Method

In the embodiment, examples of the ink jet recording method includes a serial-type recording method, and a line-type recording method of performing recording in one scanning operation using a line head with a width that is equal to or greater than a recording width of the recording medium, and either one of them can be used.

The ink jet recording method according to the embodiment described below is a serial-type recording method using the aforementioned ink jet recording apparatus provided with the ink jet head and is a recording method using the aforementioned ink treatment solution set. Specifically, the recording method includes an ink adhesion step of ejecting the ink composition, which is a water-based ink jet ink containing the coloring material, from the ink jet head and causing the ink composition to adhere to the poorly absorbable recording medium and a treatment solution adhesion step of ejecting the treatment solution containing the coagulant from the ink jet head and causing the treatment solution to adhere to the poorly absorbable recording medium, any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m between the dynamic surface tension at 10 ms and a dynamic surface tension at 1000 ms, and the other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m between the dynamic surface tension at 10 ms and a dynamic surface tension at 1000 ms.

In the case of the serial-type recording method, the number of times the main scanning, in which nozzle groups used for recording a certain composition face a certain position on the recording medium where recording is performed and pass through the position, is performed is referred to as a number of times of main scanning. When a certain nozzle group in FIG. 3 is filled with the ink and the nozzle group is used for recording, for example, and the distance of sub-scanning performed once is a distance corresponding to one second of the length of the nozzle group in the sub-scanning direction, the number of times of the main scanning of the ink is two. It is possible to set a large number of times of main scanning by setting a short distance of sub-scanning, and it is possible to set a small number of times of main scanning b setting a long distance of sub-scanning. The number of times of main scanning is preferably large since it is possible to increase a total amount of composition to be caused to adhere and to cause the composition to adhere in a divided manner in main scanning performed a plurality of times. Meanwhile, the small number of main scanning is preferable in terms of a high recording speed. Note that the number of times of main scanning is also referred to as a number of passes. In the embodiment, the number of times of main scanning is the number of times of main scanning when the aforementioned group is regarded as an ejection nozzle group that is actually used for recording. The number of times of main scanning is preferably two to twenty five, is more preferably three to twenty, and is further preferably four to sixteen.

In the embodiment, the ink jet recording method has the ink adhesion step and the treatment solution adhesion step performed by the aforementioned main scanning, and as needed, the ink jet recording method has a secondary heating step.

2.1. Treatment Solution Adhesion Step

The treatment solution adhesion step is a step of causing the aforementioned treatment solution that reacts with the ink composition to adhere to the recording medium. By causing the treatment solution to adhere to the recording medium, it is possible to improve rubbing resistance and image quality of an obtained image.

In the embodiment, the treatment solution adhesion step is performed at the same time with the adhesion of the ink composition or is performed at a timing different from that of the adhesion of the ink composition. Performing the treatment solution adhesion step at the same time means that the treatment solution and the ink composition are caused to adhere to a predetermined region on the recording medium in the same main scanning as described above. Performing the treatment solution adhesion step at a timing different from that of the ink composition means that the ink composition is caused to adhere to a predetermined region on the recording medium in main scanning and the treatment solution is caused adhere to the region in other main scanning. When the treatment solution adhesion step is performed at a different timing, the ink composition may be caused to adhere to the predetermined region in main scanning performed after the main scanning in which the treatment solution is caused to adhere to the region, or the treatment solution may be caused to adhere to the predetermined region in main scanning performed after the main scanning in which the ink composition is caused to adhere to the region.

Even when the treatment solution adhesion step is performed at a different timing, it is possible to obtain the effect of reducing pinholes and coagulation irregularity if the composition caused to adhere to the recording medium in previous main scanning is not completely dried yet on the recording medium when the composition caused to adhere in the later main scanning is caused to adhere. In this regard, the surface temperature of the recording medium in the composition adhesion step preferably falls within a range described below.

Since the aforementioned ink treatment solution set is used, it is possible to obtain an image with excellent image quality and further excellent rubbing resistance especially when the treatment solution adhesion step is performed at the same time with the adhesion of the ink composition and droplets of the treatment solution and droplets of the ink immediately come into contact with each other on the recording medium in a state in which the treatment solution and the ink are not substantially dried.

In a case of the alignment of the nozzle groups illustrated in FIG. 3, the treatment solution adhesion step is performed at the same time with the ink adhesion step, which will be described later. In a case of the alignment of the nozzle groups illustrated in FIG. 6, a part of the treatment solution adhesion step is performed before the ink adhesion step, and the remaining part thereof is performed at the same time with the ink adhesion step.

In the embodiment, the mass of droplet of the treatment solution (the amount of droplet) is preferably equal to or greater than 4 ng, is preferably equal to or greater than 10 ng, and is preferably equal to or greater than 14 ng. The amount of the treatment solution adhering is preferably equal to or less than 25 ng, is preferably equal to or less than 20 ng, and is preferably equal to or less than 18 ng. The amount of the treatment solution adhering and the recording density may be smaller than those of the ink composition, and when the mass of droplet of the treatment solution is excessively small, drying advances, and a probability of contact with the ink on the recording medium excessively decreases. Meanwhile, when the mass of droplet of the treatment solution is excessively large, landing interference between treatment solution droplets increases, and pinholes are likely to be generated. Therefore, by setting the mas of droplet of the treatment solution within the aforementioned range, drying properties and wetting and spreading of the treatment solution fall within appropriate ranges, pinholes and coagulation irregularity on the poorly absorbable recording medium are curbed, and it is thus possible to obtain an image with excellent image quality. Further, it is possible to obtain an image with excellent rubbing resistance. Here, the mass of droplet of the treatment solution is the mass of treatment solution ejected to be caused to adhere to the same location on the recording medium in main scanning performed once.

In the embodiment, it is preferable to have a region in which the amount of treatment solution adhering is equal to or greater than 10% by mass of the amount of ink composition adhering, it is more preferable to have a region in which the amount of treatment solution adhering is equal to or greater than 15% by mass of the amount of ink composition adhering, and it is further preferable to have a region in which the amount of treatment solution adhering is equal to or greater than 20% by mas of the amount of ink composition adhering. Also, it is preferable to have a region in which the amount of treatment solution adhering is equal to or less than 50% by mass of the amount of ink composition adhering, it is more preferable to have a region in which the amount of treatment solution adhering is equal to or less than 40% by mass of the amount of ink composition adhering, and it is further preferable to have a region in which the amount of treatment solution adhering is equal to or less than 35% by mass of the amount of ink composition adhering. By setting the amount of treatment solution adhering with respect to the amount of ink adhering within the aforementioned range, it is possible to obtain more satisfactory image quality on the poorly absorbable recording medium and to prevent rubbing resistance of the obtained image from being degraded.

Here, the expression that the amount of treatment solution adhering with respect to the amount of ink adhering is a predetermined value means that a region in which the amount of treatment solution adhering with respect to the amount of ink adhering is a predetermined value is included in an adhesion region on the recording medium, to which the ink and the treatment solution are caused to adhere for recording. The amount of treatment solution adhering with respect to the amount of ink adhering is preferably within the aforementioned range in the adhesion region in which the amount of ink adhering is maximum in the adhesion region. Alternatively, the amount of treatment solution adhering with respect to the amount of ink adhering is preferably within the aforementioned range in the adhesion region in which the amount of treatment solution adhering with respect to the amount of ink adhering is maximum in the adhesion region.

The recording density of treatment solution dots is preferably equal to or greater than 300 dpi×300 dpi, is more preferably equal to or greater than 600 dpi×600 dpi, and is preferably equal to or greater than 720 dpi×720 dpi. By the recording density being equal to or greater than the aforementioned range with the aforementioned amount of treatment solution adhering, it is possible to adjust wetting and spreading of the ink composition and the treatment solution, to obtain more satisfactory image quality on the poorly absorbable recording medium, and to prevent rubbing resistance of the obtained image from being degraded.

A recording medium 10 is preferably heated with a heating mechanism such as a preheater 7 illustrated in FIG. 1 before the treatment solution adhesion step or with the heating mechanism illustrated in FIG. 1 in the treatment solution adhesion step. By causing the treatment solution to adhere to the heated recording medium 10, the treatment solution and the ink ejected onto the recording medium 10 are likely to wet the recording medium 10 and spread thereon, and it is possible to uniformly apply the treatment solution and the ink. Therefore, the ink and the treatment solution sufficiently react with each other, and excellent image quality is thus obtained. Since evaporation of water content in the treatment solution and the ink advances on the recording medium 10, fluidity is degraded, and degradation of image quality such as irregularity can be curbed.

When the dynamic surface tensions of the treatment solution and the ink composition satisfy the aforementioned one and the other, the surface temperature of the recording medium is raised with the heating and drying mechanism, and the aforementioned effects of the heating are achieved, a more excellent effect of reducing pinholes and coagulation irregularity is obtained, which is preferable.

Here, the surface temperature of the recording medium 10 when the treatment solution is caused to adhere can be set independently from the preferable temperature range of the surface temperature of the recording medium 10 when the ink, which will be described later, is caused to adhere (primary heating temperature). For example, the surface temperature of the recording medium 10 when the treatment solution is caused to adhere is preferably equal to or less than 45° C., is more preferably equal to or less than 40° C., and is further preferably equal to or less than 38° C. A lower limit of the surface temperature of the recording medium 10 when the treatment solution is caused to adhere is preferably equal to or greater than 20° C., is more preferably equal to or greater than 25° C., and is further preferably equal to or greater than 30° C. When the surface temperature of the recording medium 10 when the treatment solution is caused to adhere is within the aforementioned range, it is possible to uniformly apply the treatment solution to the recording medium 10 and thus to improve rubbing resistance and image quality. Also, it is possible to curb influences of heat on the ink jet head 2. The surface temperature of the recording medium 10 when the ink is caused to adhere is preferably within the aforementioned range. However, the surface temperature can be set to a temperature that is independent from that of the treatment solution.

2.2. Ink Adhesion Step

The ink adhesion step is a step of ejecting the aforementioned ink from the ink jet head 2 and causing the ink to adhere to the poorly absorbable recording medium 10, and an image is formed on the surface of the recording medium 10 through the step.

The maximum amount of ink composition adhering per unit area on the recording medium 10 is preferably equal to or greater than 5 mg/inch$^2$, is more preferably equal to or greater than 7 mg/inch$^2$, and is further preferably equal to or greater than 10 mg/inch$^2$. Although an upper limit of the amount of ink composition adhering per unit area on the recording medium is not particularly limited, the upper limit is preferably equal to or less than 20 mg/inch$^2$, is more preferably equal to or less than 18 mg/inch$^2$, and is particularly preferably equal to or less than 16 mg/inch$^2$, for example. Also, the maximum amount of ink composition adhering is a total amount of entire ink composition to be caused to adhere. The amount of ink composition that is caused to adhere to the recording medium may be larger as compared with the treatment solution. The amount of adhesion has relatively small influences. However, when the amount of ink adhering is excessively small, drying advances, and pinholes are likely to be generated in some cases. When the amount of adhesion is excessively large, ink landing interference increases, and pinholes are generated in some cases.

The ink adhesion step may include a heating step of heating the recording medium 10 before the ink adhesion step or at the same time with the ink adhesion step and is preferably performed on the recording medium 10 heated in the heating step. The heating step is preferably blowing of warm air to the recording medium using the IR heater 3, the platen heater 4, and the fan. In the heating step, it is possible to quickly dry the ink on the recording medium 10, and bleeding is curbed. Also, it is possible to form an image with excellent rubbing resistance and image quality.

An upper limit of the temperature of the nozzle surface when the ink adheres to the recording medium 10 in the ink adhesion step, that is, the maximum temperature during recording may be equal to or less than 55° C., is preferably equal to or less than 50° C., is more preferably equal to or less than 45° C., and is further preferably equal to or less than 40° C. By the temperature of the nozzle surface when the ink is caused to adhere falling within the aforementioned range, it is possible to curb influences of heat on the ink jet head 2 and to prevent clogging of the ink jet head 2 and the nozzles. A lower limit of the temperature of the nozzle surface during ink jet recording is preferably a temperature that is higher than an ordinary temperature, is preferably equal to or greater than 28° C., is more preferably equal to or greater than 30° C., and is further preferably equal to or greater than 32° C. By the temperature of the nozzle surface during the ink jet recording falling within the aforementioned range, it is possible to quickly dry the ink on the recording medium 10, to fix the ink in an early stage, to curb bleeding, and thereby to form an image with excellent rubbing resistance and image quality. Also, the temperature of the nozzle surface when the ink adheres to the recording medium 10 may be achieved by raising the temperature through heat generation of the recording device such as the ink jet head 2 itself or may be achieved by being affected by the heat in the aforementioned heating step.

The maximum time of one scanning operation in the ink adhesion step is preferably equal to or greater than 0.8 seconds, is equal to or greater than 0.8 seconds and equal to or less than 5.0 seconds, is further preferably equal to or greater than 0.8 seconds and equal to or less than 4.0 seconds, and is particularly preferably equal to or greater than 1.5 seconds and equal to or less than 2.5 seconds. By the maximum time of one scanning operation falling within the aforementioned range, the ink adhesion step is suitable for recording on a recording medium with a wide width.

The "maximum time of one scanning operation" represents a time during which one point of the ink jet head faces the recording medium when recording is performed from an end to an end of the recording medium in the scanning direction in one scanning operation. Also, scanning in a time shorter than the aforementioned maximum time of one scanning operation may be performed in the recording in accordance with an image to be recorded. An average scanning speed in the ink adhesion step is preferably 60 to 100 cm/second.

2.3. Secondary Heating Step

The ink jet recording method according to the embodiment may have a secondary heating step (also referred to as a "post-heating step") of heating the recording medium 10, to which the ink composition has adhered, with the heating heater 5 illustrated in FIG. 1 after the aforementioned ink adhesion step. In this manner, a resin and the like contained in the ink composition on the recording medium 10 are melted, an ink film is formed, the ink film is firmly fixed on the recording medium 10, excellent film forming properties are achieved, and an image with excellent rubbing resistance and high image quality can thus be obtained in a short period of time.

An upper limit of the surface temperature of the recording medium 10 heated by the heating heater 5 is preferably equal to or less than 120° C., is more preferably equal to or less than 110° C., and is more preferably equal to or less than 100° C. Also, a lower limit of the surface temperature of the recording medium 10 is preferably equal to or greater than 60° C., is more preferably equal to or greater than 70° C., and is more preferably equal to or greater than 80° C. By the temperature falling within the aforementioned range, an ink film is reliably formed, and it is thus possible to obtain an image with excellent rubbing resistance and high quality in a short period of time.

A step of cooling the ink composition on the recording medium 10 with the cooling fan 6 illustrated in FIG. 1 may be included after the secondary heating step.

2.4. Other Processes

The recording method according to the embodiment may include a step of circulating the ink composition and the treatment solution with a section other than a pressure generation section for ejecting ink for recording, that is, another mechanism that is not one of mechanisms for ejecting ink provided in the ink jet head 2 for recording and may have a cleaning step of causing the ink composition and the treatment solution to be discharged.

Examples of the mechanisms for ejecting the ink provided in the ink jet head 2 for recording include a piezoelectric element provided in a pressure chamber (not illustrated) and configured to apply a pressure to the ink and a heater element. The cleaning step may be a step of applying a pressure from the outside to the ink jet head 2 and causing nozzles to discharge the ink composition and the treatment solution. By including the process, it is possible to curb a concern that a resin is welded to an inner wall of the ink jet head 2 and to achieve more excellent ejection stability even when there is such a concern.

Examples of aforementioned another mechanism include mechanisms for applying pressures such as an application of a negative pressure and an application of a positive pressure from the upstream of the ink jet head. These are not ink discharge caused by functions of the ink jet head itself, namely flashing. That is, this does not correspond to discharge using a function of causing the ink jet head to eject the ink for recording.

In the embodiment, the maximum distance of one scanning operation is preferably equal to or greater than 50 cm. Here, the "maximum distance of the one scanning distance" represents a distance by which one point of the ink jet head faces the recording medium when recording is performed from an end to an end of the recording medium in the scanning direction in one scanning operation. The distance is preferably 50 to 500 cm, is more preferably 50 to 400 cm, is further preferably 55 to 300 cm, and is yet further preferably 60 to 200 cm. Also, the distance is particularly preferably 70 to 190 cm, is more particularly preferably 100 to 180 cm, and is further particularly preferably 130 to 170 cm. By the distance being equal to or greater than 50 cm, a recorded product that is effective for display can be obtained. Although an upper limit of the distance is not particularly limited, the upper limit is preferably equal to or less than 500 cm in terms of a configuration of the recording apparatus. When recording is performed, scanning of a distance that is shorter than the aforementioned maximum distance of one scanning operation may be performed in accordance with an image to be recorded.

According to the ink jet recording method in the embodiment in which the ink composition and the treatment solution are used and droplets of the ink composition and the treatment solution come into contact with each other on the recording medium before the droplets are completely dried as described above, it is possible to improve image quality in recording using water-based ink on the poorly absorbable recording medium by the ink composition and the treatment solution having a specific relationship in dynamic surface tensions as described above.

3. Examples

Although the embodiments of the present disclosure will be further specifically described below with reference to examples and comparative examples, the embodiments are not limited only to these examples.

3.1. Preparation of Treatment Solution and Ink

The respective constituents were mixed and stirred using a bead mill so as to satisfy the blending proportions described in Tables 1 and 2, and the mixtures were filtered with a membrane filter with a hole diameter of 5 μm, thereby obtaining treatment solutions 1 to 12 and inks 1 to 12. Pigments were used in the form of pigment dispersions in which the pigments were dispersed in advance in water using 50% by mass of styrene acryl dispersant resins with respect to the pigment. All the numerical values in Tables 1 and 2 are represented in units of % by mass, and water was added such that the total mass of each ink was 100% by mass. For cationic resins described in Table 1 and pigments, resins, and waxes described in Table 2, values in terms of solid content are represented.

TABLE 1

|  | Treatment solution 1 | Treatment solution 2 | Treatment solution 3 | Treatment solution 4 | Treatment solution 5 | Treatment solution 6 |
|---|---|---|---|---|---|---|
| Dipropylene glycol dimethyl ether | 15.0 | 15.0 | 15.0 | 15.0 | 15.0 | 15.0 |
| 2-pyrrolidone | 10.0 | 10.0 | 10.0 | 10.0 | 10.0 | 10.0 |
| 1,2-hexanediol | 1.0 | 1.0 | 1.0 | 3.0 | 1.0 | 1.0 |
| Calcium acetate | 5.0 | 5.0 | 5.0 | 5.0 | 5.0 | 5.0 |

TABLE 1-continued

|  | | | | | | |
|---|---|---|---|---|---|---|
| monohydrate | | | | | | |
| Acetic acid | | | | | | |
| Cationic resin (in terms of solid content) | | | | | | |
| Antifoaming agent | 0.1 | 0.1 | 0.1 | 0.1 | 0.1 | 0.1 |
| Surfactant 1 | 0.8 | | | | | 1.5 |
| Surfactant 2 | | 0.8 | | 0.3 | | |
| Surfactant 3 | | | | | | |
| Surfactant 4 | 0.1 | | | 2.0 | 0.8 | |
| Surfactant 5 | | | 1.0 | | | 1.5 |
| Surfactant 6 | | | | | | |
| Surfactant 7 | | | | | | |
| Pure water | Residual amount | Residual amount | Residual amount | Residual amount | Residual amount | Residual amount |
| Total | 100.0 | 100.0 | 100.0 | 100.0 | 100.0 | 100.0 |
| Dynamic y (10 ms) | 35.7 | 32.0 | 36.2 | 31.9 | 33.5 | 35.7 |
| Dynamic y (1000 ms) | 25.9 | 25.1 | 26.5 | 25.1 | 28.1 | 25.5 |
| Variation width | 9.7 | 6.9 | 9.7 | 6.8 | 5.4 | 10.1 |

|  | Treatment solution 7 | Treatment solution 8 | Treatment solution 9 | Treatment solution 10 | Treatment solution 11 | Treatment solution 12 |
|---|---|---|---|---|---|---|
| Dipropylene glycol dimethyl ether | 15.0 | 15.0 | 15.0 | 15.0 | 15.0 | 15.0 |
| 2-pyrrolidone | 10.0 | 10.0 | 10.0 | 10.0 | 10.0 | 10.0 |
| 1,2-hexanediol | 1.0 | 1.0 | 1.0 | 1.0 | 1.0 | 1.0 |
| Calcium acetate monohydrate | 5.0 | 5.0 | 5.0 | 5.0 | | |
| Acetic acid | | | | | 3.0 | |
| Cationic resin (in terms of solid content) | | | | | | 4.0 |
| Antifoaming agent | 0.1 | 0.1 | 0.1 | 0.1 | 0.1 | 0.1 |
| Surfactant 1 | | | 0.2 | 0.5 | | |
| Surfactant 2 | | | | | 0.8 | 0.8 |
| Surfactant 3 | | | | | | |
| Surfactant 4 | | 1.5 | | | | |
| Surfactant 5 | 2.0 | 1.5 | | | | |
| Surfactant 6 | | | 1.8 | | | |
| Surfactant 7 | | | | 0.8 | | |
| Pure water | Residual amount | Residual amount | Residual amount | Residual amount | Residual amount | Residual amount |
| Total | 100.0 | 100.0 | 100.0 | 100.0 | 100.0 | 100.0 |
| Dynamic y (10 ms) | 34.5 | 36.5 | 34.3 | 34.6 | 32.5 | 32.2 |
| Dynamic y (1000 ms) | 25.3 | 26.5 | 26.1 | 27.1 | 26.1 | 25.5 |
| Variation width | 9.3 | 10.0 | 8.3 | 7.5 | 6.4 | 6.7 |

TABLE 2

|  | Ink 1 | Ink 2 | Ink 3 | Ink 4 | Ink 5 | Ink 6 |
|---|---|---|---|---|---|---|
| Propylene glycol | 5.0 | 5.0 | 5.0 | 5.0 | 5.0 | 5.0 |
| Dipropylene glycol dimethyl ether | 3.0 | 3.0 | 3.0 | 3.0 | 3.0 | 3.0 |
| 2-pyrrolidone | 13.0 | 13.0 | 13.0 | 13.0 | 13.0 | 13.0 |
| 1,2-hexanediol | 2.0 | 2.0 | 2.0 | 2.0 | 2.0 | 2.0 |
| Glycerin | | | | | | |
| Cyan pigment dispersion | 3.0 | 3.0 | 3.0 | 3.0 | 3.0 | 3.0 |
| St-Ac resin emulsion | 3.0 | 3.0 | 3.0 | 3.0 | 3.0 | 3.0 |
| Wax emulsion | 0.5 | 0.5 | 0.5 | 0.5 | 0.5 | 0.5 |
| Surfactant 2 | | | | | | |
| Surfactant 3 | | | | | | |
| Surfactant 4 | 0.5 | | 0.1 | 0.1 | 0.5 | 0.2 |
| Surfactant 5 | | | 1.0 | | | 0.2 |
| Surfactant 8 | | 0.5 | | | | |
| Surfactant 7 | 0.2 | | | 0.5 | 0.1 | 0.3 |
| Antifoaming agent | 0.1 | 0.1 | 0.1 | 0.1 | 0.1 | 0.1 |
| Pure water | Residual amount | Residual amount | Residual amount | Residual amount | Residual amount | Residual amount |
| Total | 100.0 | 100.0 | 100.0 | 100.0 | 100.0 | 100.0 |
| Dynamic y (10 ms) | 36.4 | 34.5 | 35.8 | 35.5 | 34.4 | 36.6 |

TABLE 2-continued

|  | | | | | |
|---|---|---|---|---|---|
| Dynamic y (1000 ms) | 27.6 | 26.5 | 25.7 | 27.8 | 26.1 | 28.4 |
| Variation width | 8.8 | 8.0 | 10.0 | 7.7 | 8.3 | 8.1 |

|  | Ink 7 | Ink 8 | Ink 9 | Ink 10 | Ink 11 | Ink 12 |
|---|---|---|---|---|---|---|
| Propylene glycol | 5.0 | 5.0 | 5.0 | 5.0 | 5.0 | |
| Dipropylene glycol dimethyl ether | 3.0 | 3.0 | 3.0 | 3.0 | 3.0 | |
| 2-pyrrolidone | 13.0 | 13.0 | 13.0 | 13.0 | 13.0 | 13.0 |
| 1,2-hexanediol | 2.0 | 2.0 | 2.0 | 2.0 | 2.0 | 1.0 |
| Glycerin | | | | | | 8.5 |
| Cyan pigment dispersion | 3.0 | 3.0 | 3.0 | 3.0 | 3.0 | 3.0 |
| St-Ac resin emulsion | 3.0 | 3.0 | 3.0 | 3.0 | 3.0 | 3.0 |
| Wax emulsion | 0.5 | 0.5 | 0.5 | 0.5 | 0.5 | 0.5 |
| Surfactant 2 | 0.5 | | | | | |
| Surfactant 3 | | 0.8 | | | | |
| Surfactant 4 | | | 1.0 | | | 0.5 |
| Surfactant 5 | | | | 0.5 | 0.8 | |
| Surfactant 8 | | | | 0.3 | | |
| Surfactant 7 | 0.2 | 0.2 | 0.1 | | 0.5 | 0.2 |
| Antifoaming agent | 0.1 | 0.1 | 0.1 | 0.1 | 0.1 | 0.1 |
| Pure water | Residual amount | Residual amount | Residual amount | Residual amount | Residual amount | Residual amount |
| Total | 100.0 | 100.0 | 100.0 | 100.0 | 100.0 | 100.0 |
| Dynamic y (10 ms) | 35.9 | 32.1 | 30.3 | 35.9 | 36.0 | 36.0 |
| Dynamic y (1000 ms) | 26.5 | 25.4 | 23.5 | 30.1 | 29.0 | 27.1 |
| Variation width | 9.3 | 6.7 | 6.8 | 5.8 | 7.1 | 8.9 |

Details of substances described in Tables 1 and 2 were as follows.

Cationic resin: amine-epichlorohydrin condensed-type polymer, product name "CATION MASTER PD-7", manufactured by Yokkaichi Chemical Co., Ltd.

Antifoaming agent: acetylenediol-based surfactant, product name "SURFYNOL DF110D", manufactured by Nisshin Chemical Co., Ltd.

Surfactant
  Surfactant 1: silicone-based surfactant, product name "BYK-378", manufactured by BYK Japan KK
  Surfactand 2: silicone-based surfactant, product name "BYK-345", manufactured by BYK Japan KK
  Surfactant 3: silicone-based surfactant, product name "BYK-3455", manufactured by BYK Japan KK
  Surfactant 4: silicone-based surfactant, product name "BYK-348", manufactured by BYK Japan KK
  Surfactant 5: silicone-based surfactant, product name "SILFACE SAG008", manufactured by Nisshin Chemical Co., Ltd.
  Surfactant 6: silicone-based surfactant, product name "BYK-333", manufactured by BYK Japan KK
  Surfactant 7: acetylene-based surfactant, product name "OLFINE E1010" manufactured by Nisshin Chemical Co., Ltd.
  Surfactant 8: silicone-based surfactant, product name "SILFACE SAG503A" manufactured by Nisshin Chemical Co., Ltd.

Wax emulsion: production name "AQUACER 507", water-based modified paraffin wax emulsion, BYK Japan KK Cyan pigment dispersion: 20% by mass of C.I. Pigment blue 15:3, 10% by mass of styrene-acrylic acid copolymer with an acid value of 150 at Mw7000, 10% by mass of diethylene glycol, and a residual amount of ion exchanged water were mixed and dispersed using a zirconia bead mill, thereby obtaining a pigment dispersion.

St-Ac resin emulsion: a copolymer with a styrene/acrylic acid/methyl methacrylate/cyclohexyl methacrylate ratio of 75/0.5/0.5/14.5/10

A surfactant for emulsion polymerization was "NEWCOL NT-30", which was a name of a product manufactured by Nippon Nyukazai Co., Ltd, and 2 parts by weight of surfactant for emulsion polymerization was added with respect to 100 parts by weight of the total amount of monomer, thereby causing emulsion polymerization.

Note that dynamic surface tensions of the treatment solution and the ink were measured at 25° C. using a bubble pressure method, that is, using a "bubble pressure dynamic surface tension meter BP-2", which was a name of a product manufactured by KRUSS that was a dynamic surface tension meter using a principle of a maximum bubble pressure method.

3.2. Recording Method

The treatment solutions and the inks described in Tables 1 and 2 were used to perform recording in combinations and under conditions described in Tables 3 to 5. As an apparatus, a heater was modified in an ink jet printer, which was manufactured by Seiko Epson Corporation, the product name of which was "SC-S80650", the platen heater, the IR heater, and the fan illustrated in FIG. 1 were mounted and operated thereon such that a recording media were able to be heated and the temperature was able to be adjusted. The ink ejection amount was set to 7.5 mg/inch$^2$, the treatment solution ejection amount was set to 1.875 mg/inch$^2$, and the resolution was set to 720×720 dpi. The droplet sizes of the treatment solution were set to those described in Tables 3 and 4, and the droplet size of the ink was set to 16 ng. Secondary drying conditions using a post-heater after the recording were set to 70° C. and 15 minutes. The recording temperature was a surface temperature of the recording media when the treatment solution and the ink were caused to adhere, and when the recording temperature was equal to or less than 23° C., no heating mechanisms were used, and the test was conducted in a constant-temperature room set to the recording temperature.

The recording was performed on the recording media set in the printer by alternately performing main scanning using a carriage with a head mounted thereon and sub-scanning that was paper feeding. The ink jet head has the configuration in FIG. 3. The nozzle groups 16 and 15a were used, and the entire nozzle groups 16 and 15a were used as ejection nozzle groups. The treatment solution and the ink were ejected at the same time, and four-pass recording was performed.

As the recording media, the following recording media 1 to 4 were used. Here, the amount of solution absorbed was measured using the aforementioned Bristow method.

Recording medium 1: product name "ELLEAIR TACK FS CAST 73", the amount of solution absorbed: 1.85, coated paper, manufactured by Daio Paper Corporation Recording medium 2: product name "OK TOPCOAT+", the amount of solution absorbed: 3.85, coated paper, manufactured by Oji Paper Co., Ltd.

Recording medium 3: product name "IJ180Cv3-10", the amount of solution absorbed: 30.77, vinyl chloride film, manufactured by 3M Japan Limited Recording medium 4: product name "MY PAPER", the amount of solution absorbed: 38.60, ordinary paper, manufactured by Ricoh Japan Corporation

TABLE 3

|  | Example 1 | Example 2 | Example 3 | Comparative Example 1 | Comparative Example 2 | Comparative Example 3 |
|---|---|---|---|---|---|---|
| Recording medium | Recording medium 1 | Recording medium 1 | Recording medium 1 | Recording medium 1 | Recording medium 1 | Recording medium 1 |
| Treatment solution | Treatment solution 1 | Treatment solution 2 | Treatment solution 2 | Treatment solution 3 | Treatment solution 4 | Treatment solution 5 |
| Ink | Ink 1 | Ink 1 | Ink 2 | Ink 1 | Ink 1 | Ink 1 |
| Droplet size (ng) | 14.0 | 14.0 | 14.0 | 14.0 | 14.0 | 14.0 |
| Recording temperature | 30.0 | 30.0 | 30.0 | 30.0 | 30.0 | 30.0 |
| Dynamic y (10 ms); |  |  |  |  |  |  |
| Treatment solution A1; | 35.7 | 32.0 | 32.0 | 36.2 | 31.9 | 33.5 |
| Treatment solution variation width; | 9.7 | 6.9 | 6.9 | 9.7 | 6.8 | 5.4 |
| Ink X1; | 36.4 | 36.4 | 34.5 | 36.4 | 36.4 | 36.4 |
| Ink variation width; | 8.8 | 8.8 | 8.0 | 8.8 | 8.8 | 8.8 |
| X1-A1 | 0.7 | 4.4 | 2.5 | 0.2 | 4.5 | 2.9 |
| Evaluation; |  |  |  |  |  |  |
| Pinholes; | B | A | A | D | A | D |
| Coagulation irregularity; | A | B | C | B | D | C |
| Rubbing resistance | A | A | A | A | A | A |

|  | Comparative Example 4 | Comparative Example 5 | Comparative Example 6 | Comparative Example 7 | Comparative Example 8 |
|---|---|---|---|---|---|
| Recording medium | Recording medium 1 | Recording medium 1 | Recording medium 1 | Recording medium 1 | Recording medium 1 |
| Treatment solution | Treatment solution 6 | Treatment solution 2 | Treatment solution 2 | Treatment solution 2 | Treatment solution 2 |
| Ink | Ink 1 | Ink 3 | Ink 4 | Ink 5 | Ink 6 |
| Droplet size (ng) | 14.0 | 14.0 | 14.0 | 14.0 | 14.0 |
| Recording temperature | 30.0 | 30.0 | 30.0 | 30.0 | 30.0 |
| Dynamic y (10 ms); |  |  |  |  |  |
| Treatment solution A1; | 35.7 | 32.0 | 32.0 | 32.0 | 32.0 |
| Treatment solution variation width; | 10.1 | 6.9 | 6.9 | 6.9 | 6.9 |
| Ink X1; | 36.4 | 35.8 | 35.5 | 34.4 | 36.6 |
| Ink variation width; | 8.8 | 10.0 | 7.7 | 8.3 | 8.1 |
| X1-A1 | 0.7 | 3.7 | 3.5 | 2.3 | 4.5 |
| Evaluation; |  |  |  |  |  |
| Pinholes; | B | B | D | D | A |
| Coagulation irregularity; | D | D | C | B | D |
| Rubbing resistance | A | A | A | A | A |

|  | Example 4 | Example 5 | Example 6 | Example 7 | Example 8 | Example 9 | Example 10 |
|---|---|---|---|---|---|---|---|
| Recording medium | Recording medium 1 | Recording medium 1 | Recording medium 1 | Recording medium 1 | Recording medium 1 | Recording medium 1 | Recording medium 1 |
| Treatment solution | Treatment solution 1 | Treatment solution 1 | Treatment solution 1 | Treatment solution 1 | Treatment solution 1 | Treatment solution 11 | Treatment solution 12 |
| Ink | Ink 12 | Ink 1 | Ink 1 | Ink 1 | Ink 1 | Ink 1 | Ink 1 |
| Treatment solution Droplet size (ng) | 14.0 | 14.0 | 14.0 | 14.0 | 14.0 | 14.0 | 14.0 |
| Recording temperature | 30.0 | 23.0 | 45.0 | 15.0 | 50.0 | 30.0 | 30.0 |
| Dynamic y (10 ms); |  |  |  |  |  |  |  |
| Treatment solution A1; | 35.7 | 35.7 | 35.7 | 35.7 | 35.7 | 32.5 | 32.2 |
| Treatment solution variation width; | 9.7 | 9.7 | 9.7 | 9.7 | 9.7 | 6.4 | 6.7 |
| Ink X1; | 36.0 | 36.4 | 36.4 | 36.4 | 36.4 | 36.4 | 36.4 |
| Ink variation width | 8.9 | 8.8 | 8.8 | 8.8 | 8.8 | 8.8 | 8.8 |
| X1-A1 | 0.3 | 0.7 | 0.7 | 0.7 | 0.7 | 3.9 | 4.1 |

TABLE 3-continued

| Evaluation; | | | | | | | |
|---|---|---|---|---|---|---|---|
| Pinholes; | A | A | B | A | C | A | B |
| Coagulation irregularity; | C | B | B | C | B | B | A |
| Rubbing resistance | D | B | A | B | A | A | A |

| | Example 11 | Example 12 | Example 13 | Example 14 | Example 15 | Example 16 |
|---|---|---|---|---|---|---|
| Recording medium | Recording medium 1 | Recording medium 1 | Recording medium 1 | Recording medium 1 | Recording medium 2 | Recording medium 3 |
| Treatment solution | Treatment solution 1 | Treatment solution 1 | Treatment solution 1 | Treatment solution 1 | Treatment solution 1 | Treatment solution 1 |
| Ink | Ink 1 | Ink 1 | Ink 1 | Ink 1 | Ink 1 | Ink 1 |
| Treatment solution Droplet size (ng) | 4.0 | 25.0 | 3.0 | 30.0 | 14.0 | 14.0 |
| Recording temperature | 30.0 | 30.0 | 30.0 | 30.0 | 30.0 | 30.0 |
| Dynamic γ (10 ms); | | | | | | |
| Treatment solution A1; | 35.7 | 35.7 | 35.7 | 35.7 | 35.7 | 35.7 |
| Treatment solution variation width; | 9.7 | 9.7 | 9.7 | 9.7 | 9.7 | 9.7 |
| Ink X1; | 36.4 | 36.4 | 36.4 | 36.4 | 36.4 | 36.4 |
| Ink variation width | 8.8 | 8.8 | 8.8 | 8.8 | 8.8 | 8.8 |
| X1-A1 | 0.7 | 0.7 | 0.7 | 0.7 | 0.7 | 0.7 |
| Evaluation; | | | | | | |
| Pinholes; | B | B | C | C | A | B |
| Coagulation irregularity; | B | B | B | B | A | B |
| Rubbing resistance | A | A | A | A | A | A |

TABLE 4

| | Example 17 | Example 18 | Example 19 | Comparative Example 10 | Comparative Example 11 | Comparative Example 12 |
|---|---|---|---|---|---|---|
| Recording medium | Recording medium 1 | Recording medium 1 | Recording medium 1 | Recording medium 1 | Recording medium 1 | Recording medium 1 |
| Treatment solution | Treatment solution 3 | Treatment solution 7 | Treatment solution 3 | Treatment solution 8 | Treatment solution 9 | Treatment solution 6 |
| Ink | Ink 8 | Ink 8 | Ink 7 | Ink 8 | Ink 8 | Ink 8 |
| Droplet size (ng) | 14.0 | 14.0 | 14.0 | 14.0 | 14.0 | 14.0 |
| Recording temperature | 30.0 | 30.0 | 30.0 | 30.0 | 30.0 | 30.0 |
| Dynamic γ (10 ms); | | | | | | |
| Treatment solution A1; | 36.2 | 34.5 | 36.2 | 36.5 | 34.3 | 35.7 |
| Treatment solution variation width; | 9.7 | 9.3 | 9.7 | 10.0 | 8.3 | 10.1 |
| Ink X1; | 32.1 | 32.1 | 35.9 | 32.1 | 32.1 | 32.1 |
| Ink variation width | 6.7 | 6.7 | 9.3 | 6.7 | 6.7 | 6.7 |
| X1-A1 | 4.1 | 2.4 | 0.3 | 4.4 | 2.2 | 3.5 |
| Evaluation; | | | | | | |
| Pinholes; | A | A | B | D | B | B |
| Coagulation irregularity; | B | C | A | B | D | D |
| Rubbing resistance | A | A | A | A | A | A |

| | Comparative Example 13 | Comparative Example 14 | Comparative Example 15 | Comparative Example 16 | Comparative Example 17 |
|---|---|---|---|---|---|
| Recording medium | Recording medium 1 | Recording medium 1 | Recording medium 1 | Recording medium 1 | Recording medium 1 |
| Treatment solution | Treatment solution 10 | Treatment solution 3 | Treatment solution 3 | Treatment solution 3 | Treatment solution 3 |
| Ink | Ink 8 | Ink 11 | Ink 9 | Ink 3 | Ink 10 |
| Droplet size (ng) | 14.0 | 14.0 | 14.0 | 14.0 | 14.0 |
| Recording temperature | 30.0 | 30.0 | 30.0 | 30.0 | 30.0 |
| Dynamic γ (10 ms); | | | | | |
| Treatment solution A1 | 34.6 | 36.2 | 36.2 | 36.2 | 36.2 |
| Treatment solution variation width; | 7.5 | 9.7 | 9.7 | 9.7 | 9.7 |
| Ink X1; | 32.1 | 36.0 | 30.3 | 35.8 | 35.9 |
| Ink variation width; | 6.7 | 7.1 | 6.8 | 10.0 | 5.8 |
| X1-A1 | 2.5 | 0.2 | 5.9 | 0.4 | 0.3 |
| Evaluation; | | | | | |
| Pinholes; | D | D | A | A | D |
| Coagulation irregularity; | C | C | D | D | A |
| Rubbing resistance | A | A | A | A | A |

TABLE 5

|  | Reference Example 1 | Reference Example 2 | Reference Example 3 | Reference Example 4 | Reference Example 5 | Reference Example 6 | Reference Example 7 | Reference Example 8 |
|---|---|---|---|---|---|---|---|---|
| Recording medium | Recording medium 4 | Recording medium 4 | Recording medium 4 | Recording medium 4 | Recording medium 4 | Recording medium 4 | Recording medium 4 | Recording medium 4 |
| Treatment solution | Treatment solution 3 | Treatment solution 4 | Treatment solution 5 | Treatment solution 6 | Treatment solution 2 | Treatment solution 2 | Treatment solution 2 | Treatment solution 2 |
| Ink | Ink 1 | Ink 1 | Ink 1 | Ink 1 | Ink 3 | Ink 4 | Ink 5 | Ink 6 |
| Droplet size (ng) | 14.0 | 14.0 | 14.0 | 14.0 | 14.0 | 14.0 | 14.0 | 14.0 |
| Recording temperature | 30.0 | 30.0 | 30.0 | 30.0 | 30.0 | 30.0 | 30.0 | 30.0 |
| Dynamic y (10 ms); |  |  |  |  |  |  |  |  |
| Treatment solution A1; | 36.2 | 31.9 | 33.5 | 35.7 | 32.0 | 32.0 | 32.0 | 32.0 |
| Treatment solution variation width; | 9.7 | 6.8 | 5.4 | 10.1 | 6.9 | 6.9 | 6.9 | 6.9 |
| Ink X1; | 36.4 | 36.4 | 36.4 | 36.4 | 35.8 | 35.5 | 34.4 | 36.6 |
| Ink variation width; | 8.8 | 8.8 | 8.8 | 8.8 | 10.0 | 7.7 | 8.3 | 8.1 |
| X1-A1 | 0.2 | 4.5 | 2.9 | 0.7 | 3.7 | 3.5 | 2.3 | 4.5 |
| Evaluation; |  |  |  |  |  |  |  |  |
| Pinholes; | A | A | A | A | A | A | A | A |
| Coagulation irregularity; | B | C | C | C | C | C | B | C |
| Rubbing resistance | — | — | — | — | — | — | — | — |

3.3. Evaluation Method 3.3.1. Evaluation of Image Quality Depending on Presence of Pinholes Solid patterns with a size of 50×50 mm were produced by the aforementioned recording method, three points at random positions were observed by a magnification of 400× using a stereoscopic microscope, and areas of pinhole parts were evaluated by the following criteria. As the microscope, "VHX-5000" which was a name of a product manufactured by Keyence Corporation was used.

(Evaluation Criteria)
A: Void area≤0.01%
B: 0.01%<void area 0.03%
C: 0.03%<void area 0.1%
D: 0.1%<void area 3.3.2. Evaluation of Image Quality Depending on Presence of Coagulation Irregularity The recording patterns obtained in 3.3.1 were visually observed, and presence of coagulation irregularity appearing as concentration irregularity along the scanning direction was evaluated by the following criteria. In examples in which coagulation irregularity was particularly observed, the location where the coagulation irregularity was present appeared in a streak shape in the width direction, and it was recognized that the coagulation irregularity was caused by recording based on a multi-pass scheme.

(Evaluation Criteria)
A: No coagulation irregularity appearing as concentration irregularity was not observed in the solid surface.
B: Minute coagulation irregularity of less than 0.5 mm appearing as concentration irregularity was observed in the solid surface.
C: Coagulation irregularity of less than 2 mm appearing as concentration irregularity was observed in the solid surface.
D: Large coagulation irregularity appearing as concentration irregularity was observed in the solid surface.

3.3.3. Evaluation of Rubbing Resistance

The recording patterns obtained in 3.3.1 were cut into rectangular shape with a size of 30×150 mm, and presence of peeling when the recording patterns were rubbed with a plainly woven cloth ten times under a load of 300 g was evaluated by the following criteria in a JSPS ablation resistance type rubbing test.

(Evaluation Criteria)
A: Neither peeling nor transfer to the cloth occurred.
B: Although no peeling occurred, transfer to the cloth occurred.
C: Although peeling occurred, the proportion of the peeling with respect to the evaluation area was less than 10%.
D: The proportion of the peeling was equal to or greater than 10%.

3.4. Results of Evaluating Recording Method

Results of tests for evaluating the recording method are shown in Tables 3 to 5.

In all the examples in which the dynamic surface tensions of the inks and the treatment solutions satisfied any one and the other one described above and the recording was performed on poorly absorbable recording media, excellent pinhole curbing properties and excellent coagulation irregularity properties were achieved. Meanwhile, either the pinhole curbing properties or the coagulation irregularity curbing properties were degraded in all the comparative examples in which the aforementioned conditions were not satisfied. Details will be given below.

First, Table 3 showing an example in which the dynamic surface tension of the treatment solution at 10 ms was greater than 32.0 mN/m and less than 36.0 mN/m and a difference between the dynamic surface tension at 10 ms and a dynamic surface tension at 1000 ms was equal to or greater than 6.0 mN/m and equal to or less than 10.0 mN/m will be described. In this example, the ink composition corresponded to the aforementioned other one, the dynamic surface tension at 10 ms was relatively high, and it was easy to adjust the dynamic surface tension.

In Examples 1 to 3, all the evaluation results were equal to or greater than C. In Example 2, the difference between the dynamic surface tensions of the ink and the treatment solution was large, and a high evaluation result was obtained in regard to pinholes since the dynamic surface tension of the treatment solution was lower and a variation width was smaller as compared with Example 1, while a low evaluation result was obtained in regard to coagulation irregularity. In Example 3, the dynamic surface tension of the ink was lower, the variation width was smaller, and the difference between the dynamic surface tensions of the ink and the treatment solution was smaller as compared with Example 2, and a low evaluation result was obtained in terms of coagulation irregularity.

In Comparative Example 1, the dynamic surface tension of the treatment solution was higher as compared with Example 1, and image quality was degraded due to insufficient wetting of the recording medium. Meanwhile, in Comparative Example 2, a high evaluation result was obtained in terms of pinholes since the dynamic surface tension of the treatment solution was lower as compared with Example 1 and the recording medium was excessively wetted, while an evaluation result of coagulation irregularity was degraded. In Comparative Example 3, the evaluation results of pinholes and coagulation irregularity were degraded due to insufficient wetting of the recording medium since the dynamic surface tension of the treatment solution was lower and the variation width was also smaller as compared with Example 1. Meanwhile, in Comparative Example 4, an evaluation result of coagulation irregularity was degraded since the variation width of the dynamic surface tension of the treatment solution was larger as compared with Example 1 and the recording medium was excessively wetted.

In Comparative Example 5, evaluation results of pinholes and coagulation irregularity were degraded since the variation width of the ink was larger as compared with Example 2 and the recording medium was excessively wetted. Meanwhile, in Comparative Example 6, evaluation results of pinholes and coagulation irregularity were degraded due to insufficient wetting of the recording medium since the variation width of the ink was smaller as compared with Example 2. In Comparative Example 7, an evaluation result of pinholes was degraded due to insufficient wetting of the recording medium since the dynamic surface tension of the ink was lower as compared with Example 2. Meanwhile, in Comparative Example 8, an evaluation result of coagulation irregularity was degraded since the dynamic surface tension of the ink was higher as compared with Example 2 and the recording medium was excessively wetted.

In Example 4, drying properties were poorer as compared with Example 1, and evaluation results of coagulation irregularity and rubbing properties were degraded since the ink contained a large amount of glycerin.

Examples 5 to 8 were examples in which recording temperatures were different from that in Example 1. In Examples 5 and 7, drying was unlikely to advance, and a high evaluation result was obtained in terms of pinholes since the drying temperatures were lower than that in Example 1 while drying properties were degraded and evaluation results of coagulation irregularity and rubbing resistance were degraded. In Example 8, the drying temperature was relatively high, and evaluation results of pinholes and coagulation irregularity tended to be degraded.

Examples 9 and 10 were examples in which coagulants in the treatment solutions were different from that in Example 1. When organic acids were used as coagulants, a high evaluation result was not obtained in terms of pinholes, and an evaluation result of coagulation irregularity was degraded.

Examples 11 to 14 were examples in which the amounts of droplets of the treatment solutions were different from that in Example 1. When the amount of droplets of the treatment solution decreased as compared with Example 11, drying properties of the treatment solution advanced, poor wetting and spreading of the treatment solution were achieved, and coagulation irregularity occurred as compared with Example 1. When the amount of droplets of the treatment solution further decreased as compared with Example 13, not only an evaluation result of coagulation irregularity but also an evaluation result of pinholes were degraded. Meanwhile, when the amount of droplets of the treatment solution increased as compared with Example 12, ink recording density decreased, and coagulation irregularity occurred as compared with Example 1. When the amount of droplets of the treatment solution further increased as compared with Example 14, not only an evaluation result of coagulation irregularity but also an evaluation result of pinholes were degraded.

Examples 15 and 16 were examples in which recording media were different from that in Example 1. In Example 15 in which the amount of solution absorbed by the recording medium was larger than that in Example 1, a high evaluation result was obtained in terms of pinholes. Meanwhile, in Example 16 in which the amount of solution absorbed by the recording medium was smaller than Example 1, an evaluation result of coagulation irregularity was degraded.

Next, Table 4 showing an example in which the dynamic surface tension of the ink at 10 ms was greater than 32.0 mN/m and less than 36.0 mN/m and a difference between the dynamic surface tension at 10 ms and a dynamic surface tension at 1000 ms was equal to or greater than 6.0 mN/m and equal to or less than 10.0 mN/m will be described.

In Examples 17 to 19, all evaluation results were equal to or greater than C. In Example 18, the difference between the dynamic surface tensions of the ink and the treatment solution decreased, and an evaluation result of coagulation irregularity was slightly degraded since the dynamic surface tension of the treatment solution was lower as compared with Example 17 and the variation with was also small. In Example 19, the dynamic surface tension of the ink was higher, the variation width was smaller, the difference between the dynamic surface tensions of the ink and the treatment solution decreased as compared with Example 17, and an evaluation result of pinholes was degraded, while a high evaluation result was obtained in terms of coagulation irregularity.

In Comparative Example 10, the dynamic surface tension of the treatment solution was higher as compared with Example 17, and evaluation results of pinholes and coagulation irregularity were degraded due to insufficient wetting of the recording medium. Meanwhile, in Comparative Example 11, evaluation results of pinholes and coagulation irregularity were degraded since the dynamic surface tension of the treatment surface was lower as compared with Example 17 and the recording medium was excessively wetted. In Comparative Example 12, evaluation results of pinholes and coagulation irregularity were degraded since the variation width of the dynamic surface tension of the treatment solution was larger as compared with Example 17 and the recording medium was excessively wetted. Meanwhile, in Comparative Example 13, evaluation results of pinholes and coagulation irregularity were degraded due to insufficient wetting of the recording medium since the variation width of the dynamic surface tension of the treatment solution was smaller as compared with Example 17.

In Comparative Example 14, evaluations of pinholes and coagulation irregularity were degraded due to insufficient wetting of the recording medium since the dynamic surface tension of the ink was higher as compared with Example 17. Meanwhile, in Comparative Example 15, an evaluation result of coagulation irregularity was degraded since the dynamic surface tension of the ink was lower as compared with Example 17 and the recording medium was excessively wetted. In Comparative Example 16, an evaluation result of coagulation irregularity was degraded since the variation width of the dynamic surface tension of the ink was higher as compared with Example 17 and the recording medium was excessively wetted. Meanwhile, in Comparative Example 17, a high evaluation result was obtained in terms of coagulation irregularity due to insufficient wetting of the recording medium since the variation width of the dynamic surface tension of the ink was smaller as compared with Example 17, while an evaluation result of pinholes was degraded.

A reference example shown in Table 5 was an example in which recording was performed on an ordinary paper that was an absorbable recording medium. In all the examples, no pinholes occurred, evaluation results in terms of coagulation irregularity were equal to or greater than C, and no problems occurred in image quality. In this manner, no problems occurred in the absorbable recording medium. Rubbing resistance was not tested for the absorbable recording medium since the recording medium ripped, and it was not possible to create recorded products with excellent rubbing resistance.

Although not shown in the table, the treatment solution was separately recorded before the ink instead of performing simultaneous ejection with the ink. Specifically, the upper half of the nozzle group 16 was used as the treatment solution ejection nozzle group, and the lower half of the nozzle group 15*a* was used as the ink composition ejection nozzle group for recording. Evaluation results of pinholes and coagulation irregularity were not very different unlike the aforementioned example of simultaneous ejection, and the entire evaluation results were high. This was considered to be because droplets of the treatment solution and droplets of the ink came into contact with each other on the recording medium in a dried state to some extent. Based on this fact, it was recognized that the embodiment was especially effective for the case in which simultaneous ejection was performed.

As described above, pinholes, coagulation irregularity, and the like were curbed, and it was possible to improve image quality by any one of the ink and the treatment solution having a dynamic surface tension of greater than 32.0 mN/m and less than 36.0 mN/m at 10 ms and having a difference of equal to or greater than 6.0 mN/m and equal to or less than 10.0 mN/m between the dynamic surface tension at 10 ms and a dynamic surface tension at 1000 ms and by the other one having a dynamic surface tension of greater than 34.5 mN/m and less than 36.5 mN/m at 10 ms and having a difference of equal to or greater than 8.0 mN/m and equal to or less than 10.0 mN/m between the dynamic surface tension at 10 ms and a dynamic surface tension at 1000 ms in the ink jet recording method using a water-based ink on a poorly absorbable recording medium. Further, image quality was further improved, and rubbing resistance was also improved by the difference between the dynamic surface tensions of the ink and the treatment solution at 10 ms being set to be equal to or greater than 0.2 mN/m and equal to or less than 4.5 mN/m.

The present disclosure was not limited to the aforementioned embodiments, and various modifications can be made. For example, the present disclosure includes components that are substantially the same as the components described in the embodiments (for example, components with the same functions, methods, and results or components for the same objectives and effects). The present disclosure includes components obtained by replacing non-essential parts of the components described in the embodiments. Also, the present disclosure includes components that can achieve effects and advantages that are same as those of the components described in the embodiments or components capable of achieving the same objectives. The present disclosure includes components obtained by adding known technologies to components described in the embodiments.

What is claimed is:

1. An ink treatment solution set comprising:
    an ink composition that is water-based ink jet ink containing a coloring material; and
    a treatment solution that contains a coagulant, is ejected from an ink jet head, and is used for recording, wherein
    any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m of the dynamic surface tension at 10 ms from a dynamic surface tension at 1000 ms,
    an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m of the dynamic surface tension at 10 ms from a dynamic surface tension at 1000 ms, and
    the ink treatment solution set is used for recording on a poorly absorbable recording medium.

2. The ink treatment solution set according to claim 1, wherein
    a difference of the dynamic surface tensions at 10 ms of the ink composition and the treatment solution is equal to or greater than 0.2 mN/m and equal to or less than 4.5 mN/m.

3. The ink treatment solution set according to claim 1, wherein
    the ink treatment solution set is used for an ink jet recording method including
        main scanning performed by ejecting the ink composition and the treatment solution while moving an ink ejection nozzle group and a treatment solution ejection nozzle group along a main scanning axis and
        sub-scanning of moving the poorly absorbable recording medium along a sub-scanning axis that intersects the main scanning axis,
    in which the ink ejection nozzle group and the treatment solution ejection nozzle group have an overlapping part when the ink ejection nozzle group and the treatment solution ejection nozzle group are projected along the main scanning axis.

4. The ink treatment solution set according to claim 1, wherein
    a content of polyol-based organic solvent with a standard boiling point of greater than 280° C. in the ink composition is equal to or less than 1.0% by mass.

5. The ink treatment solution set according to claim 1, wherein
    the treatment solution contains any one of a polyvalent metal salt, a cationic polymer, and an organic acid as the coagulant.

6. The ink treatment solution set according to claim 1, wherein
    the treatment solution is used for an ink jet recording method of ejecting the treatment solution from the ink jet head such that an amount of droplet of the treatment solution is equal to or greater than 4 ng and equal to or less than 25 ng, thereby causing the treatment solution to adhere to the poorly absorbable recording medium.

7. The ink treatment solution set according to claim 1, wherein
a surface temperature of the poorly absorbable recording medium when the treatment solution is ejected from the ink jet head and is caused to adhere to the poorly absorbable recording medium is equal to or greater than 20° C. and equal to or less than 45° C.

8. The ink treatment solution set according to claim 1, wherein
an amount of solution absorbed by the poorly absorbable recording medium is equal to or less than 1.5 mL/m$^2$.

9. The ink treatment solution set according to claim 1, wherein
the ink composition and the treatment solution contain surfactants.

10. The ink treatment solution set according to claim 1, wherein
the ink composition has the dynamic surface tension higher than the dynamic surface tension of the treatment solution at 10 ms, and the ink composition corresponds to the other one.

11. An ink jet recording method comprising:
an ink adhesion step of ejecting an ink composition that is water-based ink jet ink containing a coloring material from an ink jet head and causing the ink composition to adhere to a poorly absorbable recording medium; and
a treatment solution adhesion step of ejecting a treatment solution containing a coagulant from the ink jet head and causing the treatment solution to adhere to the poorly absorbable recording medium, wherein
any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m of the dynamic surface tension at 10 ms from a dynamic surface tension of 1000 ms, and
an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m of the dynamic surface tension at 10 ms from a dynamic surface tension at 1000 ms.

12. The ink jet recording method according to claim 11, wherein
a region, to which the ink composition and the treatment solution are caused to adhere, on the poorly absorbable recording medium has a region in which an amount of the treatment solution adhering is equal to or greater than 10% by mass of an amount of the ink composition adhering.

13. The ink jet recording method according to claim 11, further comprising:
a heating step of heating the poorly absorbable recording medium with a heating mechanism, wherein
the ink adhesion step and the treatment solution adhesion step are performed on the poorly absorbable recording medium that is heated.

14. The ink jet recording method according to claim 11, wherein
the ink jet head includes an ink ejection nozzle group and a treatment solution ejection nozzle group, and
the ink ejection nozzle group and the treatment solution ejection nozzle group have an overlapping part when the ink ejection nozzle group and the treatment solution ejection nozzle group are projected along a main scanning axis.

15. An ink jet recording apparatus comprising:
an ink jet head including
an ink ejection nozzle group that ejects an ink composition that is a water-based ink jet ink containing a coloring material and causes the ink composition to adhere to a poorly absorbable recording medium and
a treatment solution ejection nozzle group that ejects a treatment solution containing a coagulant and causes the treatment solution to adhere to the poorly absorbable recording medium, wherein
any one of the ink composition and the treatment solution has a dynamic surface tension of greater than 32.0 mN/m and less than 36.0 mN/m at 10 ms and has a difference of equal to or greater than 6.0 mN/m and equal to or less than 10.0 mN/m of the dynamic surface tension at 10 ms from a dynamic surface tension at 1000 ms, and
an other one of the ink composition and the treatment solution has a dynamic surface tension of greater than 34.5 mN/m and less than 36.5 mN/m at 10 ms and has a difference of equal to or greater than 8.0 mN/m and equal to or less than 10.0 mN/m of the dynamic surface tension at 10 ms from a dynamic surface tension at 1000 ms.

16. The ink jet recording apparatus according to claim 15, wherein
the ink ejection nozzle group and the treatment solution ejection nozzle group have an overlapping part when the ink ejection nozzle group and the treatment solution ejection nozzle group are projected along a main scanning axis.

* * * * *